(12) United States Patent
Kuroha

(10) Patent No.: US 6,954,250 B2
(45) Date of Patent: Oct. 11, 2005

(54) LIQUID CRYSTAL DISPLAY AND MANUFACTURING METHOD THEREOF

(75) Inventor: Shoichi Kuroha, Tokyo (JP)

(73) Assignee: NEC LCD Technologies, Ltd., Kawasaki (JP)

(*) Notice: Subject to any disclaimer, the term of this patent is extended or adjusted under 35 U.S.C. 154(b) by 0 days.

(21) Appl. No.: 10/882,286

(22) Filed: Jul. 2, 2004

(65) Prior Publication Data

US 2004/0239865 A1 Dec. 2, 2004

Related U.S. Application Data

(62) Division of application No. 09/522,609, filed on Mar. 10, 2000, now Pat. No. 6,760,089.

(30) Foreign Application Priority Data

Mar. 11, 1999 (JP) ............................................. 11-64317

(51) Int. Cl.[7] ............................................ G02F 1/1339
(52) U.S. Cl. ........................ 349/155; 349/156; 349/141; 349/110; 349/111
(58) Field of Search ................................. 349/141, 155, 349/156, 110, 111

(56) References Cited

U.S. PATENT DOCUMENTS

| | | | |
|---|---|---|---|
| 5,729,312 A | 3/1998 | Yamagishi et al. | |
| 5,959,708 A | 9/1999 | Lee et al. | |
| 6,072,557 A | 6/2000 | Kishimoto | |
| 6,097,467 A | 8/2000 | Fujimaki et al. | |
| 6,141,078 A | 10/2000 | Morii et al. | |
| 6,373,547 B2 | 4/2002 | Saito et al. | |
| 6,414,739 B2 | 7/2002 | Suzuki | |
| 6,433,852 B1 | 8/2002 | Sonoda et al. | |
| 6,441,880 B1 | 8/2002 | Utsumi et al. | |

FOREIGN PATENT DOCUMENTS

| | | |
|---|---|---|
| JP | 01-142530 | 6/1989 |
| JP | 03-118517 | 5/1991 |
| JP | 5-100219 | 4/1993 |
| JP | 8-179330 | 7/1996 |
| JP | 9-127523 | 5/1997 |
| JP | 9-304781 | 11/1997 |
| JP | 11-174466 | 7/1999 |
| KR | 94-15584 | 7/1994 |

OTHER PUBLICATIONS

Korean Office Action dated Feb. 28, 2002 with a partial English translation.
Taiwanese Office Action dated Aug. 29, 2002.
Japanese Office Action dated Dec. 4, 2001 with a partial English translation.

*Primary Examiner*—Robert H. Kim
*Assistant Examiner*—George Y. Wang
(74) *Attorney, Agent, or Firm*—McGinn & Gibb, PLLC

(57) ABSTRACT

In an LCD, according to an embodiment of the present invention, a projection 6 is structured on top of insulation layer 8 on a TFT glass substrate 10 and under part of a black matrix 9. The projection 6 encircles the transparent region in each pixel so that a spacer 17 cannot climb over the projection 6 and enter the transparent region even though a certain pressure is applied onto the substrates 10 and 11. The width of the projection 6 is equal to or less than the diameter of the spacer 17. The height of the projection 6 is equal to or longer than approximately 1% the length of the diameter of the spacer 17, and it is preferable that it be equal to or longer than approximately 2%.

1 Claim, 21 Drawing Sheets

Fig.4
Prior Art
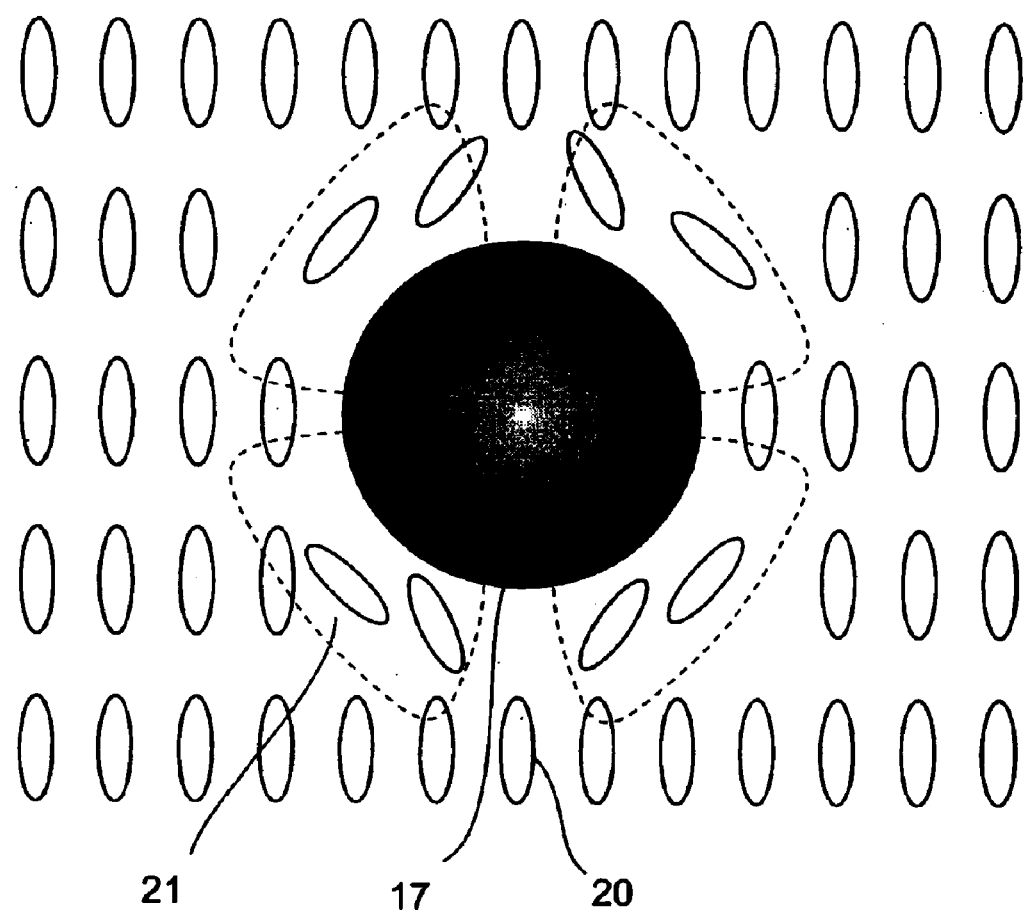
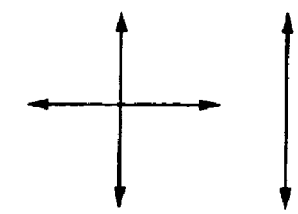
ABSORPTION   RUBBING
AXES         DIRECTION

ABSORPTION   RUBBING
AXES         DIRECTION

Fig.6
Prior Art
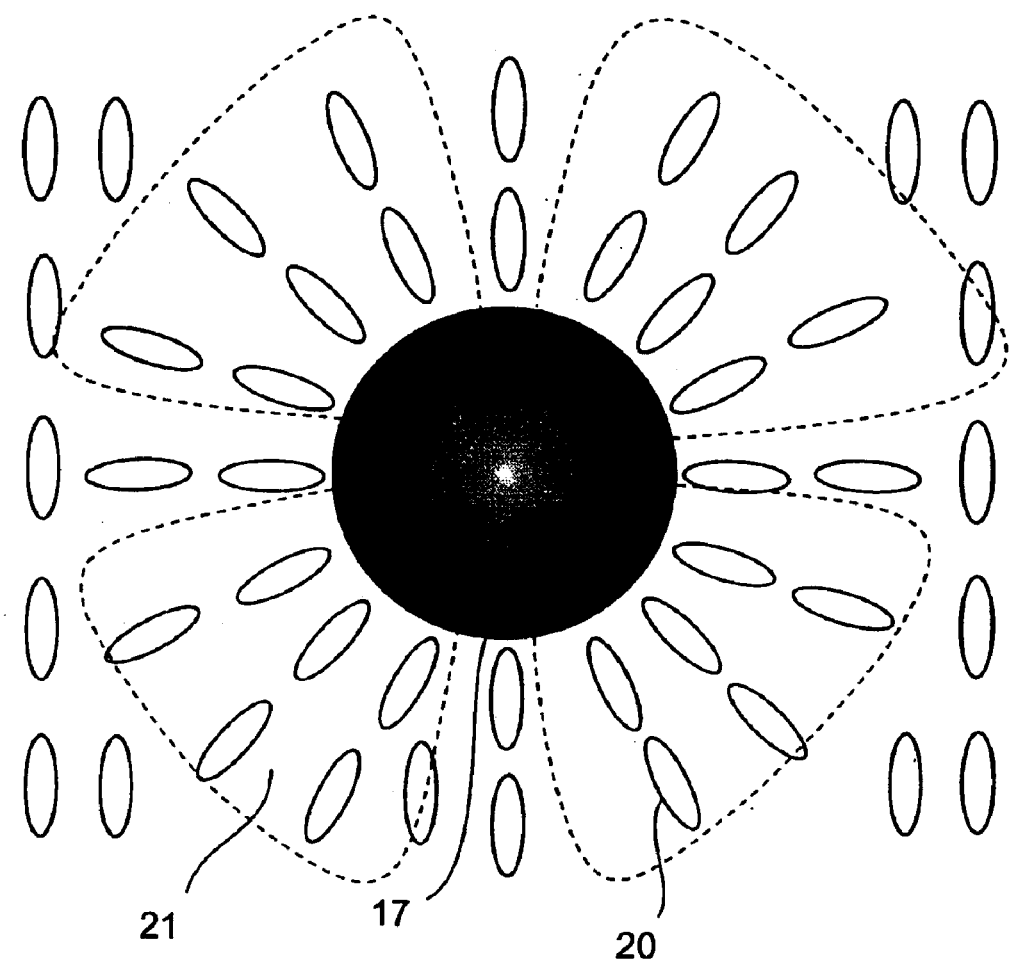
21    17    20
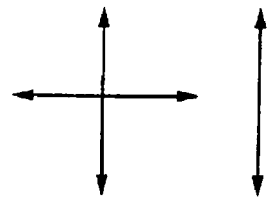
ABSORPTION  RUBBING
AXES        DIRECTION

LIQUID CRYSTAL DISPLAY AND MANUFACTURING METHOD THEREOF

The present application is a Divisional Application of U.S. patent application Ser. No. 09/522,609 filed on Mar. 10, 2000 now U.S. Pat. No. 6,760,089.

BACKGROUND OF THE INVENTION

1. Field of the Invention

The present invention relates to a liquid crystal display (LCD) and its manufacturing method.

2. Description of the Related Art

The TN (twisted nematic) mode is one of the current modes used for LCD devices. In this mode, an electric field vertical to the surface of the substrate is used to orient the liquid crystal molecule director (the molecular major axis). By doing this, the optical transmittance is controlled so that an image can be displayed on the LCD panel. This is a common type (hereafter called a vertical electric field driver-type) of LCD device.

Since, with the vertical electric field driver-type LCD, the director is oriented to be vertical to the surface of the substrate when the electric field is applied, the refractive index changes depending on the viewing angle. Accordingly, the vertical electric field driver-type LCD is not suitable when a wide viewing angle is needed.

There are also LCD devices where the liquid crystal director is oriented parallel to the surface of the substrate. These are devices where the electric field functions in a direction parallel to the surface of the substrate so that the director can rotate in a plane parallel to the surface of the substrate. Through this, the optical transmittance is controlled, and an image is displayed. This type (hereafter called a lateral electric field driver-type) of LCD device has only just been developed in recent years. With the lateral electric field driver-type LCD, because the change in refractive index due to the viewing angle is remarkably small, a high quality display can be obtained.

An example of this type of lateral electric field driver-type LCD is shown in FIGS. 1 to 3. FIG. 1 is a plan view of a vertical electric field driver-type LCD, FIG. 2 is a cross-sectional view of the LCD in FIG. 1 taken along the line JJ', and FIG. 3 is a cross-sectional view of the LCD in FIG. 1 taken along the line KK'. The pixel shown in these diagrams is formed of the following elements: a data line 1, a scanning line 2, a thin film transistor (TFT) 3, a common electrode 4 and a pixel electrode 5. The scanning line 2 is connected to an external drive circuit (not shown in the figures). The TFT 3 is a switching device. The scanning line 2 and the common electrode 4 are both structured on a substrate 10 where TFTs are fabricated (hereafter, called TFT substrate 10). The pixel electrode 5 and the data line 1 are structured on the scanning line 2 and the common electrode 4 via an interlayer insulation film 7. The pixel electrode 5 and the common electrode 4 are alternately positioned. These electrodes are covered with a protection/insulation film 8. On the protection/insulation film 8, an alignment layer 15 is laid and subjected to a rubbing treatment.

A black matrix 9 to shield light is structured in a matrix format on the underside of the opposite facing glass substrate 11. The primary and secondary colored layers 12 and 13, which are necessary for color display, are prepared on the black matrix 9. Each of the colored layers 12 and 13 are assigned to each pixel. Here, the above two colors represent two of the three primary colors: red, green, and blue. But, the one remaining colored layer is not shown in the figures.

On top of the primary and secondary colored layers 12, 13, an over-coating film 14 necessary to make the opposite facing substrate 11 flat is prepared. An alignment layer 16, which will be necessary to orient the liquid crystal 18, is laid on the over-coating film 14 and then subjected to a rubbing treatment. The rubbing treatment is performed in the direction opposite to that performed on top surface of the TFT substrate 10.

Next, liquid crystal 18 and spacers 17 are poured into the gap between the TFT substrate 10 and the opposite-facing substrate 11. The spacers 17 are randomly distributed throughout the area between them. The minimum distance between the two substrates determines the diameter of the spacers 17.

A polarizer film (not shown in the figures) is applied to the outer surface of the TFT substrate 10 where the electrode patterns have not been formed. This polarizer film is applied in a manner such that the transmission axis runs in the direction perpendicular to the direction of the rubbing. A polarizer film (also not shown in the figures) is applied to the outer surface of the opposite facing glass substrate 11 where there are no layered patterns. The transmission axis of the polarizer film on the opposite facing glass substrate 11 is perpendicular to the direction of the transmission axis of the polarizer film on the TFT substrate 10.

The LCD panel with the above structure is set up on a backlight and attached to a drive circuit.

In the above mentioned conventional LCD device, the liquid crystal poured into the narrow gap between the TFT substrate and the opposite facing substrate is normally oriented parallel to the direction that the rubbing treatment was performed on the alignment layers 15 and 16. As shown in FIG. 4, the liquid crystal molecules 20 surrounding each spacer 17 are oriented parallel to the surface of the spacer 17. In this case, when the screen is in normally black mode (i.e. the mode where no light can pass through when no voltage is applied), light permeates through the area where the liquid crystal molecules are lined up askew to the polarizer film absorption axis (for example, the liquid crystal molecules in region 21). Due to this, a leakage of light develops in the fan blade-shaped regions 21. In addition, the weak aligning force causes the alignment of the liquid crystal surrounding the spacers 17 to fall into disorder. When this happens, the amount of leakage of light around the spacers 17 increases; subsequently, as shown in FIG. 5, a doughnut-shaped region 21 of leakage of light develops.

Furthermore, when the liquid crystal panel happens to be impacted, the spacer 17 becomes charged by the friction created from being scraped against the alignment layers on the TFT substrate and the opposite facing substrate respectively. Once this occurs, a radial electric field develops around the spacers 17. In this case, because the liquid crystal molecules 20 become aligned parallel to the electric field, fan blade-shaped regions 21 of leakage of light develop, as shown in FIG. 6.

At this point, when comparing the two cases where the spacer 17 is not charged as shown in FIG. 4 and where the spacer 17 has been charged up as shown in FIG. 6, it is apparent that the latter case gives larger radial areas of leakage of light 21.

This type of charging occurs when a certain pressure or impact, which happens to hit the LCD panel, causes spacers that are positioned in the opaque region of liquid crystal molecules (i.e., in the region of crystal molecules under the black matrix) to move and be strongly rubbed by the top surfaces of the alignment layers. This occurs easily since the gap at the opaque region (i.e., the region under the black matrix 9 and on the data line 1, the scanning line 2, the TFT 3, etc.) is narrower than the gap at the transparent regions, which widens the contact area of the spacer with either surface of the alignment layers. The wider contact area allows a conveyance of a strong force, which is caused by the certain pressure or impact being applied to the LCD panel, onto the spacer. This force can easily push and move the spacer out into a transparent region of liquid crystal molecules. An electrically charged spacer that has entered the transparent region increases the total amount of leakage of light, which in turn causes a deterioration of display quality. On the other hand, a spacer that is originally positioned within the transparent region of liquid crystal molecules is rarely charged electrically by this type of movement since the gap of the transparent region is wider.

As described above, when a certain pressure or impact is applied to the LCD panel, the spacer that is positioned within an opaque region can easily migrate to a transparent region and, especially when the LCD shows at all display area, an increase in leakage of light 21 becomes noticeable. Besides, when the distribution of the spacers 17 is not uniform, the display quality becomes distorted and a problem develops where the contrast decreases due to the leakage of light.

SUMMARY OF THE INVENTION

The present invention has been developed taking the above problems into consideration, comprising an active matrix LCD device and its manufacturing method, which have been made so that the amount of leakage of light is reduced and the degradation of display quality is prevented to avoid spacer's moving into a transparent region when the device is shaken or impacted.

According to an aspect of the present invention, an LCD with at least one spacer (17) supporting two substrates that face each other is provided and is comprised of at least one spacer (17) which is positioned under an opaque region (9), and at least one projection (6, 19) which is formed under the said opaque region (9), and on at least one of the inner-most surfaces of a first and a second substrate. An example of the LCD is illustrated in FIG. 7.

According to an aspect of the present invention, an LCD with at least one spacer (17) supporting two substrates that face each other is provided and is comprised of at least one spacer (17) which is positioned under an opaque region (9), and a broken line of projections (6, 19) which are formed on at least one of the inner-most surfaces of a first and a second substrate so as to encircle a transparent region.

According to an aspect of the present invention, a method of manufacturing an LCD is provided and is comprised of the following steps of depositing an insulation film (8) on a transparent substrate (10, 11); etching off an area of the said insulation film 8 under an opaque region so as to form a ditch; and depositing an alignment layer (15) on the resultant surface of the said insulating film (8). An example of the method is illustrated in FIGS. 20 and 21.

BRIEF DESCRIPTION OF DRAWINGS

The above and other objects, features and advantages of the present invention will become more apparent from the following detailed description, when taken in conjunction with the accompanying drawings, wherein:

FIG. 4 illustrates an enlarged schematic plan view of liquid crystal molecules around the spacer in FIGS. 2 and 3;

FIG. 6 illustrates an enlarged schematic plan view of liquid crystal molecules around the spacer in FIGS. 2 and 3;

DETAILED DESCRIPTION OF THE PREFERRED EMBODIMENTS

LCDs and their manufacturing methods, according to several embodiments of the present invention, will be described with reference to the drawings. These LCDs are structured so as to prevent spacers within opaque regions of liquid crystal (e.g., areas of liquid crystal under a black matrix), which support two substrates facing each other and allow the liquid crystal to fill the space between them, from moving and entering a transparent region.

(First Embodiment)

Figure 1:
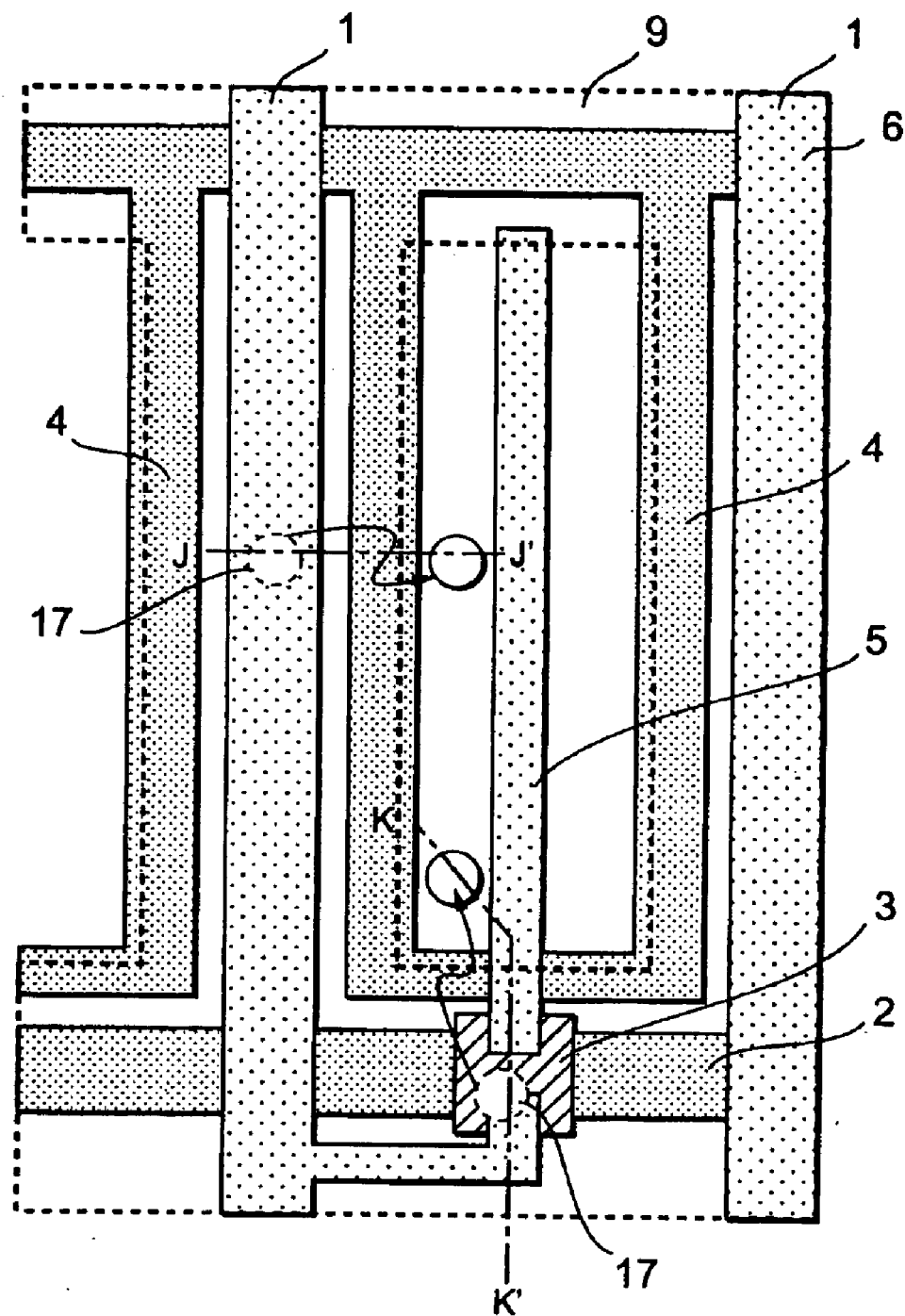
FIG. 1 illustrates a plan view of a conventional lateral electric field-type LCD.
Figure 2:
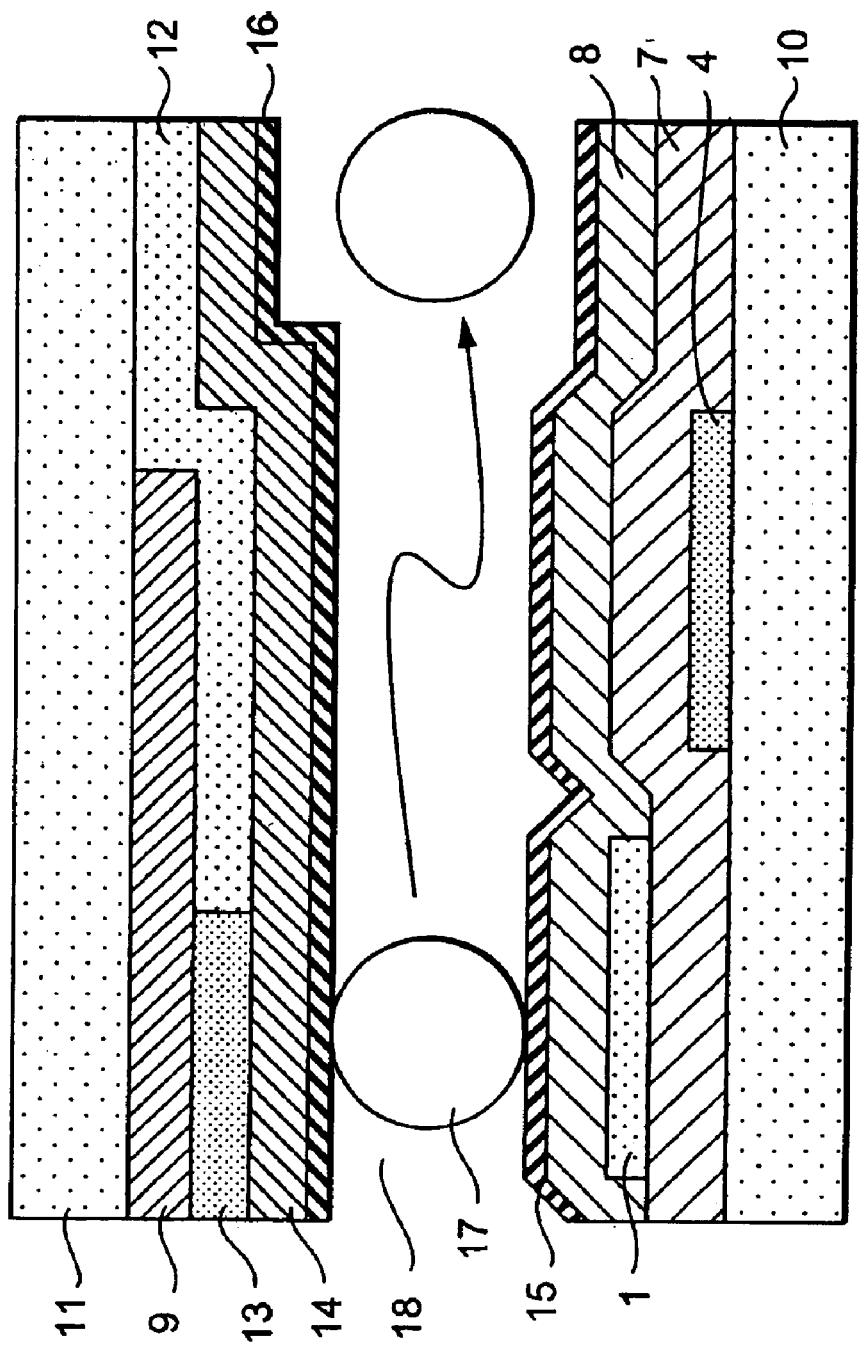
FIG. 2 illustrates a cross-sectional view of the conventional LCD taken along a line JJ' in FIG. 1.
Figure 3:
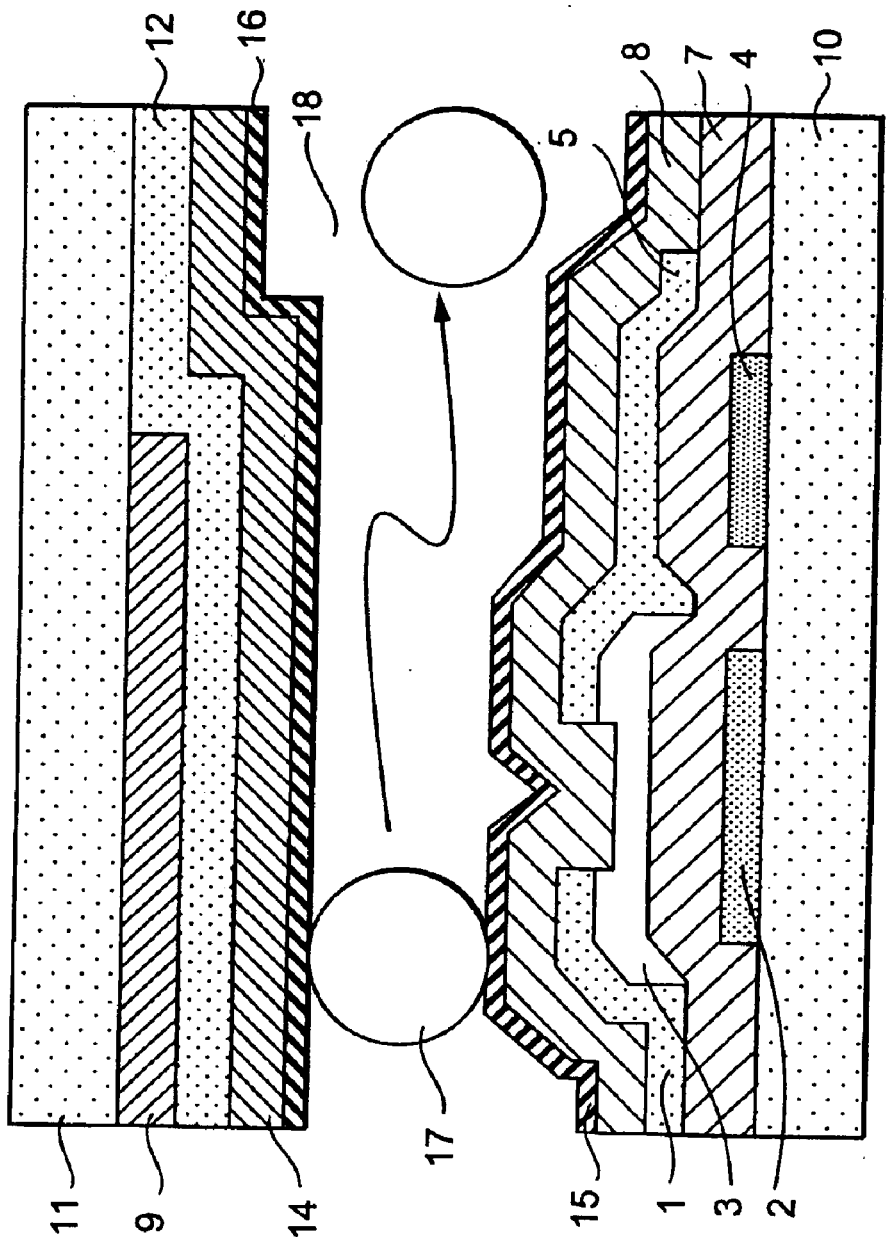
FIG. 3 illustrates a cross-sectional view of the conventional LCD taken along a line KK' in FIG. 1.
Figure 5:
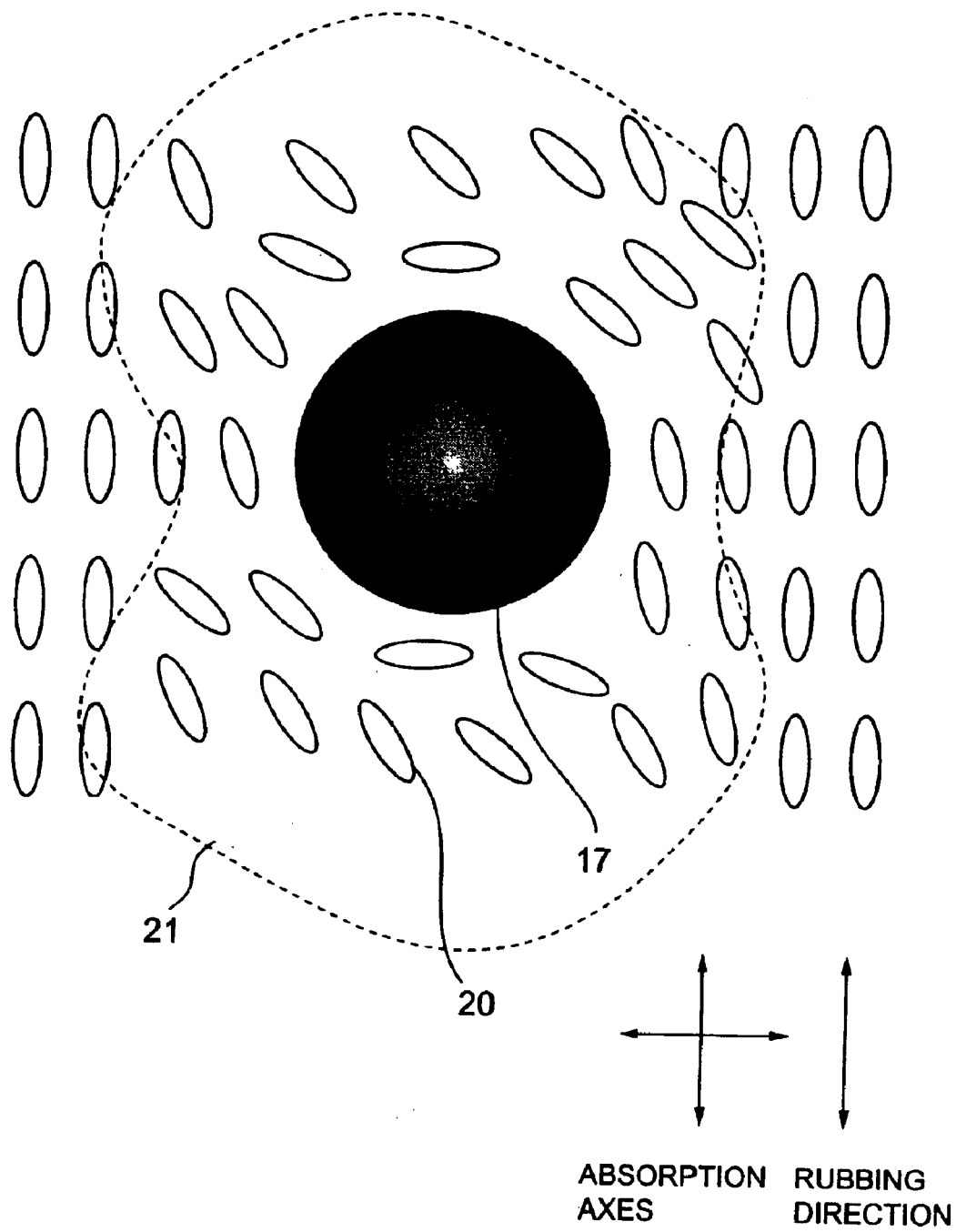
FIG. 5 illustrates an enlarged schematic plan view of liquid crystal molecules around the spacer in FIGS. 2 and 3.
Figure 7:
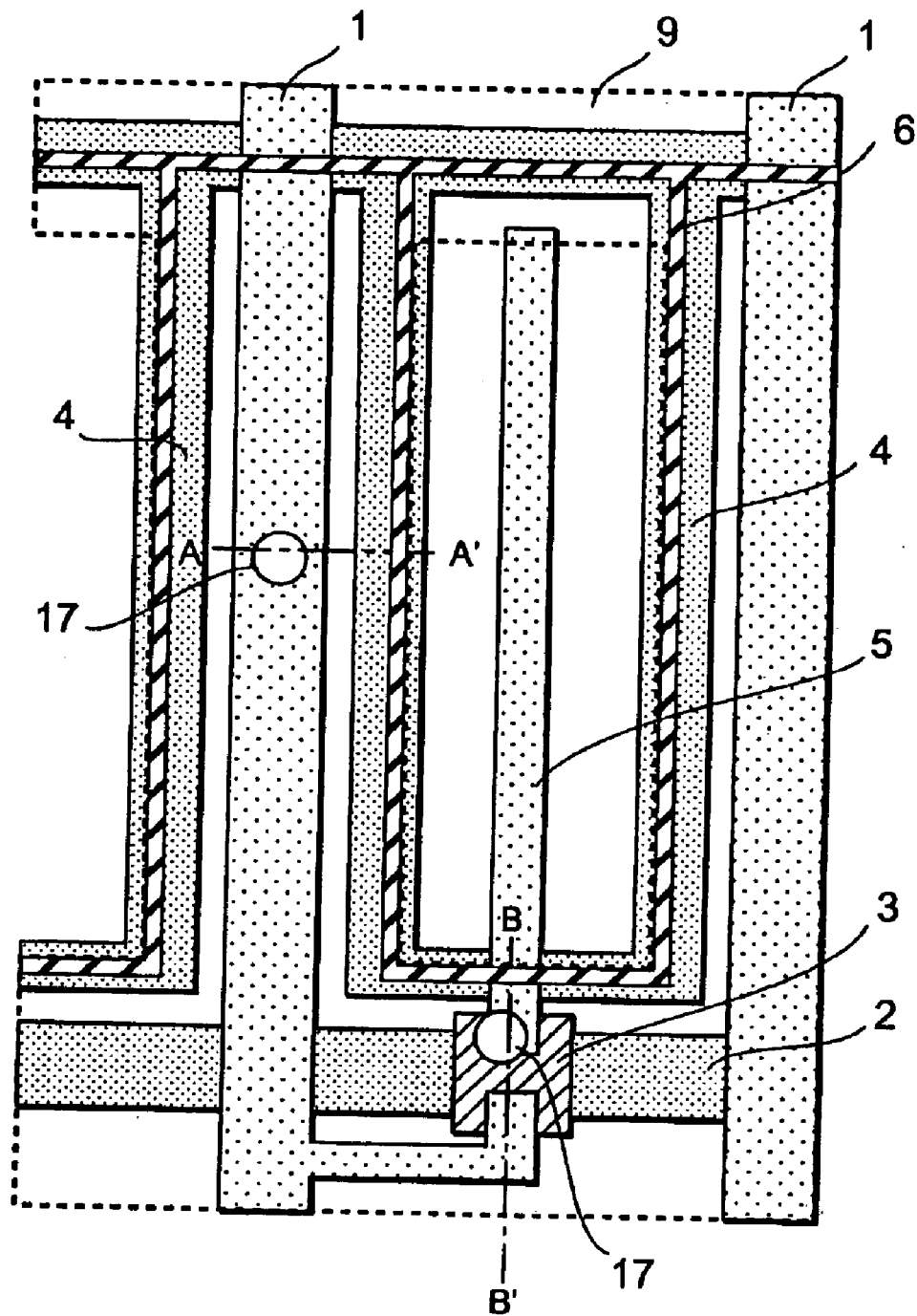
FIG. 7 illustrates a plan view of an LCD, according to the first embodiment of the present invention.
Figure 8:
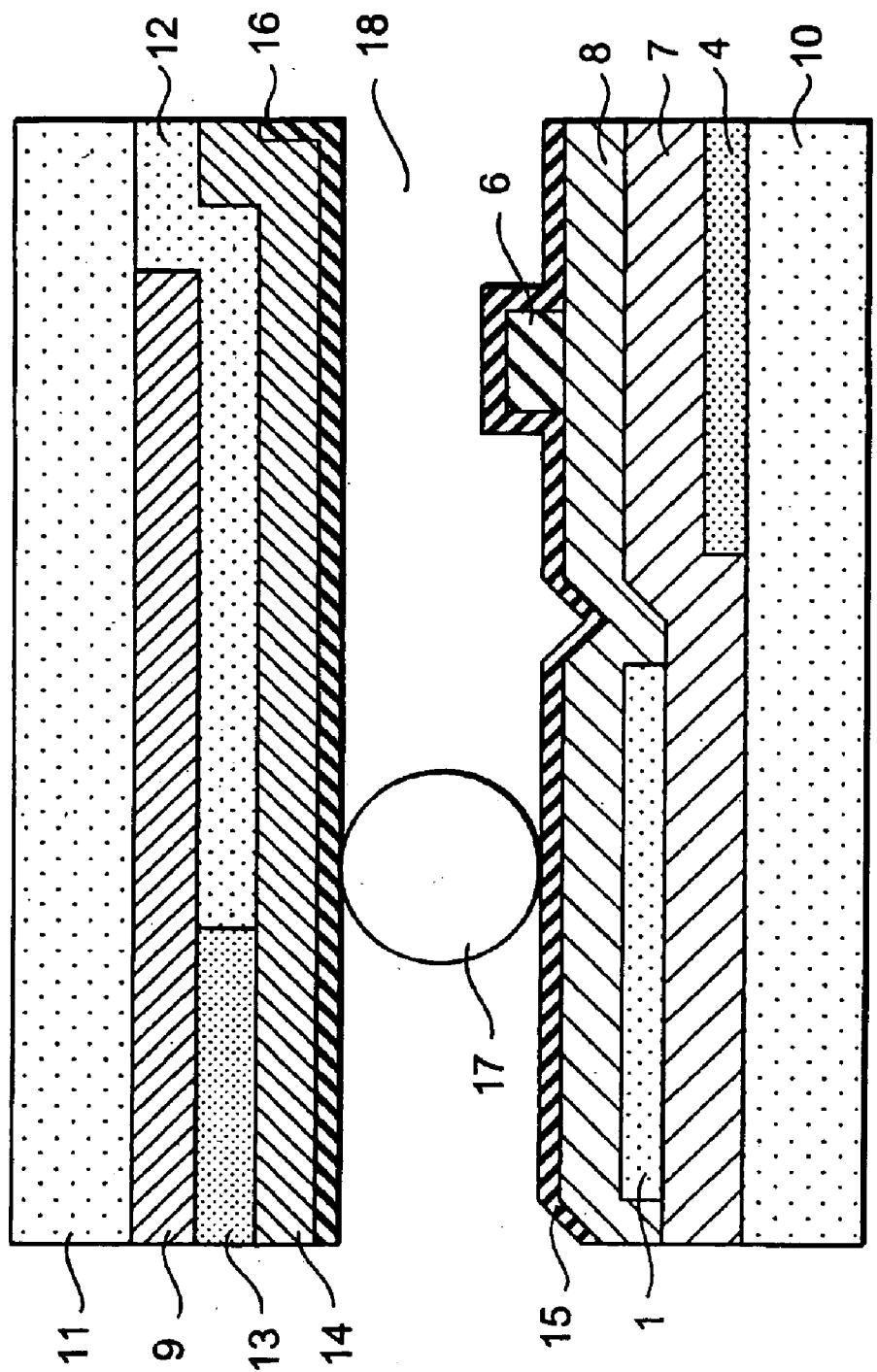
FIG. 8 illustrates a cross-sectional view of the LCD taken along a line AA' in FIG. 7.
Figure 9:
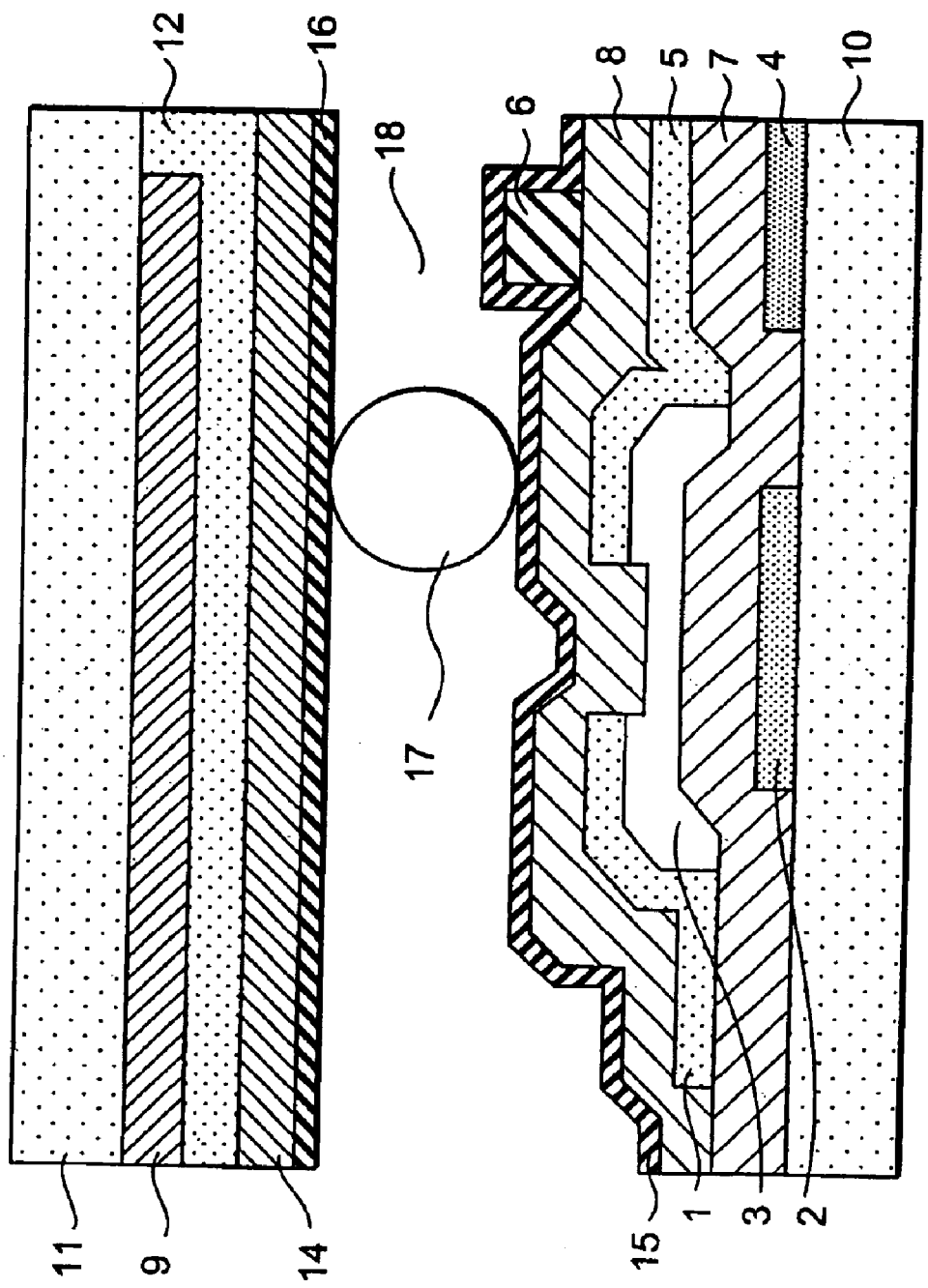
FIG. 9 illustrates a cross-sectional view of the LCD taken along a line BB' in FIG. 7.

FIG. 7 is a plan view of an active-matrix LCD, according to the first embodiment of the present invention. FIG. 8 is a partial cross-sectional view of the active-matrix LCD taken along a line AA' in FIG. 7, whereas FIG. 9 is a partial cross-sectional view of the active-matrix LCD taken along a line BB' in FIG. 7.

As shown in these figures, a projection 6 is structured under part of a black matrix 9 and on the glass substrate 10 where TFTs are fabricated (hereafter, called a TFT substrate), so as to encircle a transparent region. The projection 6 prevents any spacer 17 positioned within the light shielded regions of liquid crystal from entering the transparent region. The projection 6 is positioned in the vicinity of a data line 1, a scanning line 2, or a TFT 3 on/above the TFT substrate 10, which have been structured under the black matrix 9 on the underside of the glass substrate 11.

As shown in FIG. 8, the projection 6, which is made of a metal pattern, is fabricated at a region overlapped with a part of the black matrix 9 and also on a common electrode 4, which is positioned in the vicinity of the data line 1. The material of the projection 6 can be alternatively made of a metal such as Cr, Al, or Mo, or an insulating material such as $SiO_2$ or SiNx. The formation of the projection 6 can be done during the fabrication of TFTs on the TFT substrate. Alternatively, the projection 6 can be made of, for example, a resin and formed after the TFTs have been fabricated on the TFT substrate. An alignment layer 15 is then deposited on the surface where the projection 6 has been fabricated.

The distance between the top surface of the alignment layer 15 over the projection 6 and the undersurface of the alignment layer 16 on the opposite facing substrate 11 is shorter than that between the top surface of the alignment layer 15 on the data line 1 and the undersurface of the alignment layer 16 under the opposite facing substrate 11. The width of the projection 6 is equal to or less than the diameter of the spacer 17. Namely, if the diameter of the spacer 17 is equal to 4 µm, the width of the projection 6 is equal to or less than 4 µm.

Besides, as shown in FIG. 9; the distance between the top surface of the alignment layer 15 covering the projection 6 and the underside of the alignment layer 16 on the opposite facing substrate 11 is shorter than the distance between the top surface of the alignment layer 15 on the TFT 3 and the underside of the alignment layer 16 on the opposite facing substrate 11. The width of the projection 6 is equal to or less than the diameter of the spacer 17 in the same form as described above. The projection 6 can be made of a material identical to that of a protection/insulation film 8 and formed by the following process: First, depositing a thick protection/insulation film 8 on the resultant surface including the surfaces of the data line 1, an interlayer insulation film 7 and a scanning line 3 after TFTs have been fabricated; Secondly, selectively etching off a protection/insulation film 8 so as to leave the area of the projection 6; Lastly, depositing the alignment layer 15 over the entire resultant surface. The projection 6 can be alternatively made of a material such as a resin and be formed by the following process: First, depositing a protection/insulation film 8 on the resulting surface including the surfaces of data line 1, an interlayer insulation film 7, and a scanning line 3 after TFTs have been fabricated; Secondly, depositing any one of the materials for the projection 6 as described above on top of the protection/insulation film 8; Thirdly, selectively etching of the deposited material so as to leave the area of the projection 6; Lastly, depositing the alignment layer 15 all over the resultant surface. Afterwards, a plurality of spacers are distributed throughout the resultant surface. The fabricated opposite facing substrate, as illustrated in the upper area of FIGS. 8 and 9, is then fixed on top of the multiple spacers, and liquid crystal 18 is injected into the space between the two fabricated substrates.

The difference between the said distance from the top surface of the alignment layer 15 on the TFT 3, the data line 1 and the scanning line 2, to the undersurface of the alignment layer 16 on the opposite facing substrate 11, and the distance from the top surface of the alignment layer 15 on top of the projection 6 to the undersurface of the alignment layer 16 on the opposite facing substrate 11 is equal to or longer than approximately 1% the length of the diameter of the spacer 17, and it is preferable that it be equal to or longer than approximately 2%. In other words, the height of each projection 6 is equal to or longer than approximately 1% the length of the diameter of the spacer 17, and it is preferable that it be equal to or longer than approximately 2%. This prevents each spacer 17 positioned within the opaque regions (i.e., under the black matrix 9) from climbing over the projection 6 and then entering a transparent region of liquid crystal molecules.

In summary, according to the first embodiment of the present invention, the projection 6 is structured on the TFT substrate 10, with the distance between the top surface of the alignment layer 15 covering the projection 6 and the underside of the alignment layer 16 on the opposite facing substrate 11 being shorter than the distance between the top surface of the alignment layer 15 on the data line 1, the scanning line 2 and the TFT 3, and the undersurface of the alignment layer 16 on the opposite facing substrate 11.

Due to this structure, even if a certain pressure or impact happens to be applied onto the LCD panel, it is difficult for any spacer 17, which is positioned within the opaque regions or under the black matrix 9, to climb over the projection 6, and then enter a transparent region; therefore, the leakage of light decreases, and the contrast is improved. Also, a possible unevenness in display quality due to the areas of the leakage of light being unevenly distributed is decreased. Furthermore, the panel becomes more durable against certain vibrations and impacts: Even if certain vibrations and impacts happen to hit the fabricated active-matrix LCD after it has been inspected, they cannot damage it. As a result, high display quality is provided.

Incidentally, FIG. 7 illustrates a continuously extending projection 6 positioned along the black matrix extensions. However, the present invention is not limited to this. Alternatively, the projection 6 can be made up of multiple, intermittent pieces positioned along the extensions of the black matrix 9. In other words, a broken line of projections can be formed on the inner-most surface of the TFT substrate 10 so as to encircle the transparent regions. The length of each gap in the broken line of projections is shorter than the diameter of the spacer 17.

(Second Embodiment)

Figure 10:
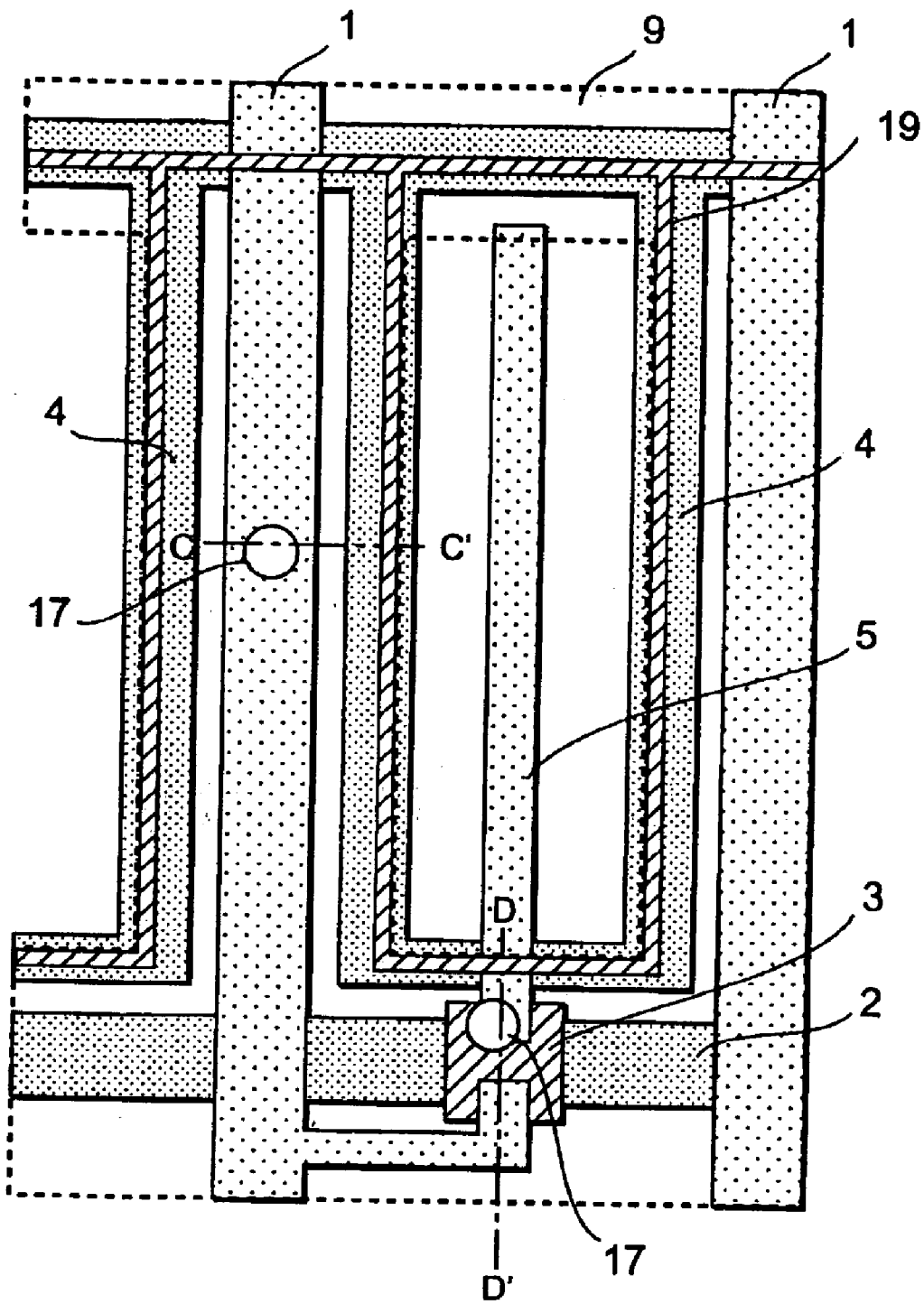
FIG. 10 illustrates a plan view of an LCD, according to the second embodiment of the present invention.
Figure 11:
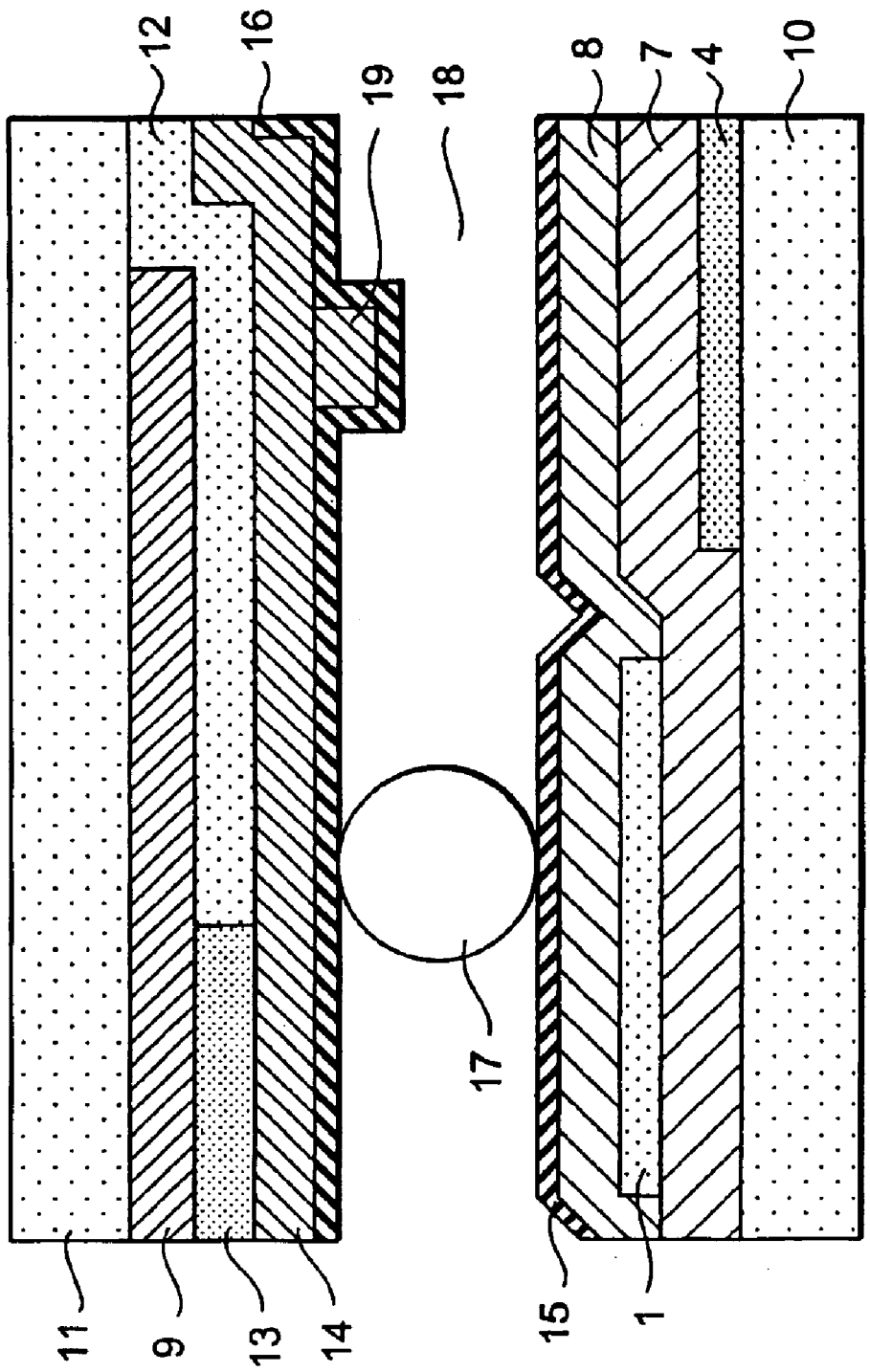
FIG. 11 illustrates a cross-sectional view of the LCD taken along a line CC' in FIG. 10.

Next, an LCD, according to the second embodiment of the present invention, will be described while referencing FIGS. 10 to 12. FIG. 10 illustrates a plan view of the LCD of the second embodiment. FIG. 11 illustrates a cross-sectional view of the LCD taken along a line CC' in FIG. 10; whereas FIG. 12 illustrates a cross-sectional view of the LCD taken along a line DD' in FIG. 10.

Figure 12:
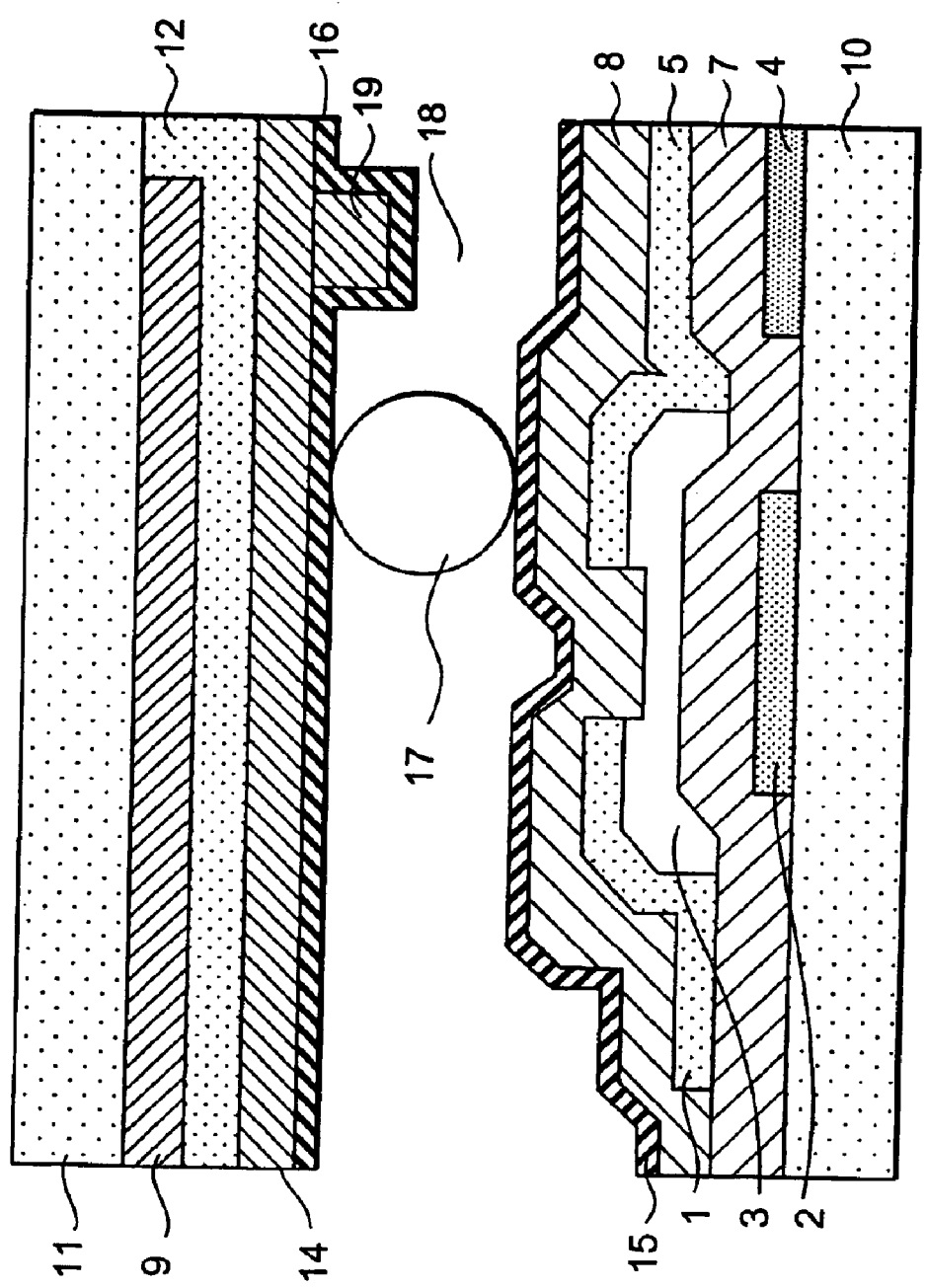
FIG. 12 illustrates a cross-sectional view of the LCD taken along a line DD' in FIG. 10.

In the LCD of the second embodiment, as shown in FIGS. 10 to 12, a projection 19 is structured on the undersurface of an opposite facing substrate 11 under part of a black matrix 9, instead of on the top surface on a TFT substrate 10, as in the first embodiment. During the fabrication of the opposite facing substrate 11, the projection 19 is structured during the formation of the first colored layer 12 and an over-coating film 14. The projection 19 is made of a material identical to that of a over-coating film 14, and can be formed by the following process: First, depositing a thick over-coating film on the underside of the colored layers including the first and the second colored layers 12 and 13, which have been deposited on the undersides of the black matrix 9 and the opposite facing glass substrate 11; Secondly, selectively etching off the deposited film so as to leave the area of the projection 19; Lastly, depositing the alignment layer 16 over the entire resultant surface. The projection 19 can be alternatively formed by the following process: First, depositing an over-coating film 14 on the underside of the colored layers including the first and the second colored layers 12 and 13, which have been deposited on the undersides of the black matrix 9 and the opposite facing glass substrate 11; Secondly, depositing a material for the projection 19 on top of the deposited over-coating film 14; Thirdly, selectively etching off the deposited material so as to leave the area of the projection 19; Lastly, depositing the alignment layer 16 over the entire resultant surface of both the over-coating film 14 and the projection 19.

Also, the projection 19 and the over-coating film 14, as shown in FIG. 11, are simultaneously formed under the black matrix 9 on the opposite facing substrate 11. The distance between the undersurface of the alignment layer 16 on top of the projection 19 and the top surface of the alignment layer 15 on the TFT substrate 10 is shorter than that between the top surface of the alignment layer 15 on the data line 1 and the undersurface of the alignment layer 16 on the opposite facing substrate 11. The width of the projection 19 is equal to or less than the diameter of the spacer 17. That is, if the diameter of the spacer 17 is equal to 4 μm, the width of the projection 19 is accordingly equal to or less than 4 μm.

As shown in FIG. 12, the projection 19 is structured under part of the black matrix 9 in the vicinity horizontal to the scanning line 2 and the TFT 3. The distance between the undersurface of the alignment layer 16 on the underside of the projection 19 and the top surface of the alignment layer 15 on the TFT substrate 10 is shorter than that between the top surface of the alignment layer 15 on both the scanning line 2 and TFT 3, and the undersurface of the alignment layer 16 on the opposite facing substrate 11. The width of the projection 19 is equal to or less than the diameter of the spacer 17, as in the same format as described above.

The difference between the distance from the top surface of the alignment layer 15 on the data line 1, the scanning line 2, and the TFT 3, to the undersurface of the alignment layer 16 at the opposite facing substrate 11, and the distance from the undersurface of the alignment layer 16 on the underside of the projection 19 to the top surface of the alignment layer 15 at the TFT substrate 10 is, as is in the same format as the first embodiment, equal to or longer than approximately 1% the length of the diameter of the spacer 17, and it is preferable that it be equal to or longer than approximately 2%. In other words, the height of each projection 19 is equal to or longer than approximately 1% the length of the diameter of the spacer 17, and it is preferable that it be equal to or longer than approximately 2%.

In summary, according to the second embodiment of the present invention, the projection 19 is structured on the opposite facing glass substrate 11 with the distance between the undersurface of the alignment layer 16 on the underside of the projection 19 and the top surface of the alignment layer 15 on the TFT substrate 10 being shorter than that between the top surface of the alignment layer 15 on the data line 1, the scanning line 2, and the TFT 3, and the undersurface of the alignment layer 16 on the opposite facing substrate 11.

Due to this format, even if a certain pressure or an impact happens to hit the LCD panel of the second embodiment, it is difficult for any spacer 17 positioned within the opaque regions (i.e., under the black matrix or on either the data line 1, the scanning line 2, or the TFT 3) to enter a transparent region. This prevents a possible increase in leakage of light caused by the entry of each spacer from occurring. As a result, the leakage of light decreases, and the contrast is improved. Also, the uneven display resulting from areas of the leakage of light being unevenly distributed is reduced. Furthermore, the panel becomes more durable against certain vibrations and impacts: Even if certain vibrations and impacts happen to hit the fabricated, active-matrix LCD after it has been inspected, they cannot damage it.

Incidentally, FIG. 10 illustrates a continuously extending projection 19 positioned along the black matrix extensions. However, the present invention is not limited to this. Alternatively, the projection 19 can be made up of multiple, intermittent pieces positioned along the extensions of the black matrix 9. In other words, a broken line of projections can be formed on the inner-most surface of the TFT substrate 11 so as to encircle the transparent regions. The length of each gap in the broken line of projections is shorter than the diameter of the spacer 17.

(Third Embodiment)

Figure 13:
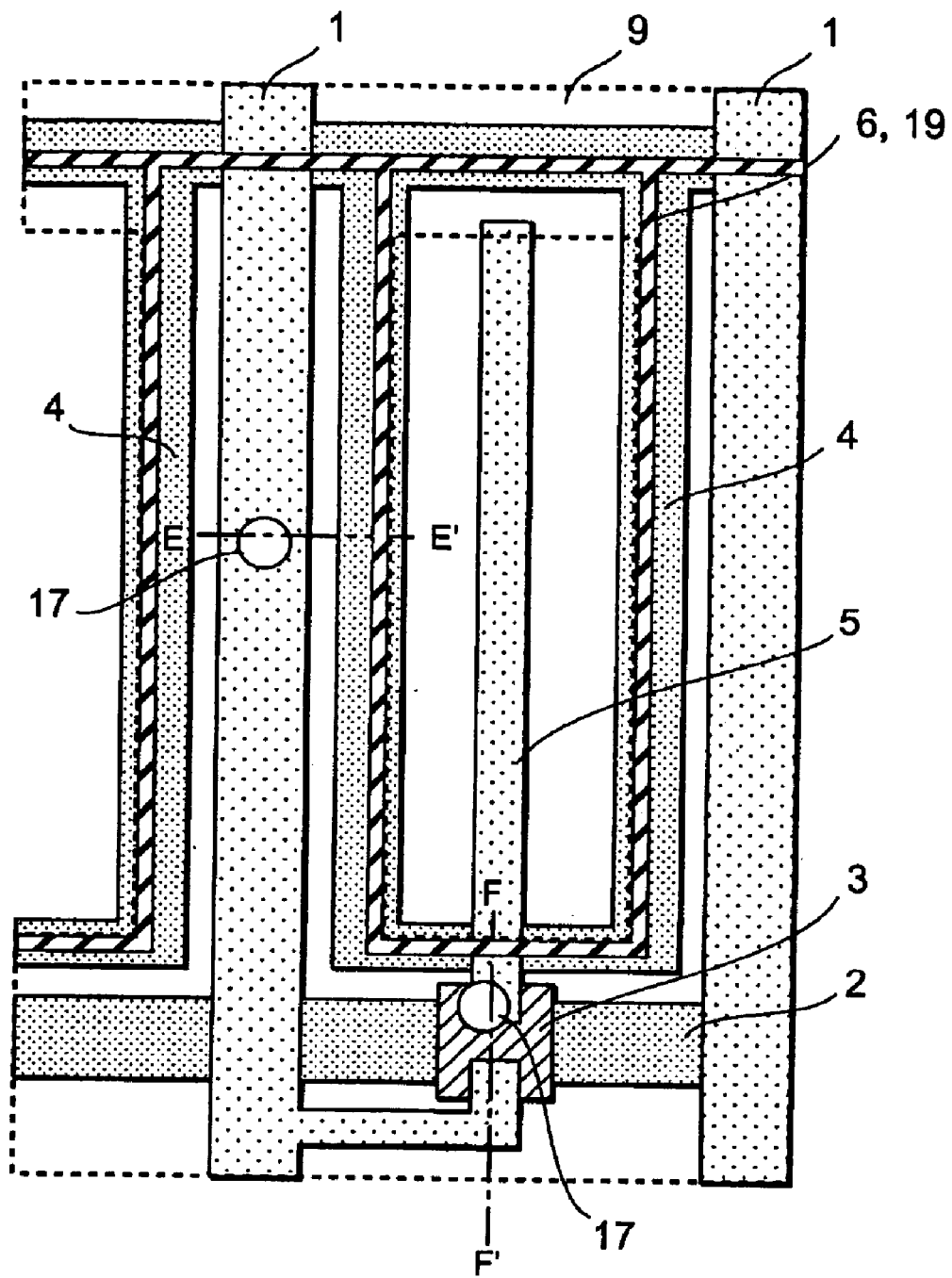
FIG. 13 illustrates a plan view of an LCD, according to the third embodiment of the present invention.
Figure 14:
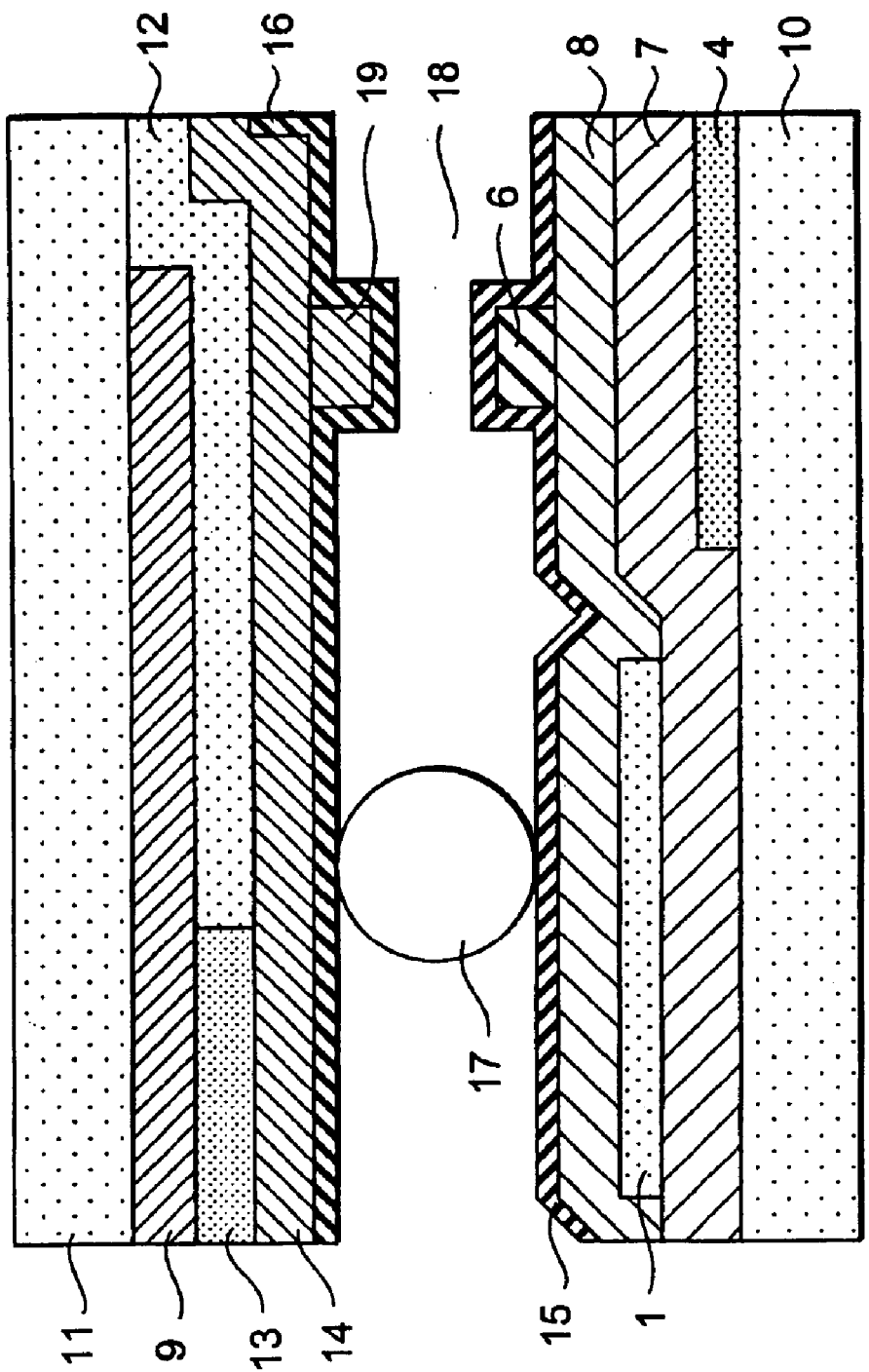
FIG. 14 illustrates a cross-sectional view of the LCD taken along a line EE' in FIG. 13.

Next, an LCD, according to the third embodiment of the present invention, will be described while referencing FIGS. 13 to 15. In brief, the LCD of the third embodiment is attained by combining the structures of the first and the second embodiment together. FIG. 13 illustrates a plan view of the LCD of the third embodiment. FIG. 14 illustrates a cross-sectional view of the LCD taken along a line EE' in FIG. 13; whereas FIG. 15 illustrates a cross-sectional view of the LCD taken along a line FF' in FIG. 13.

Figure 15:
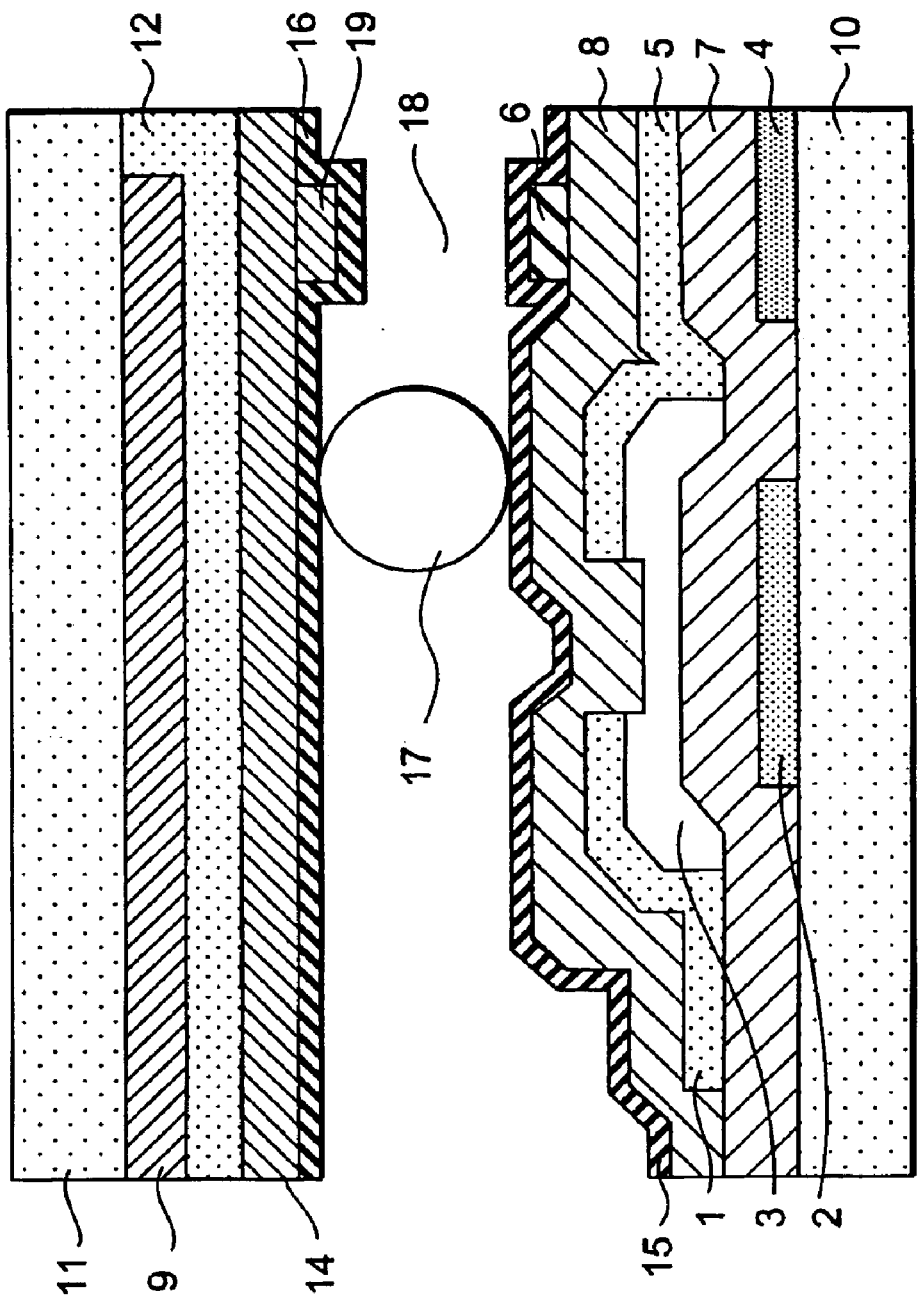
FIG. 15 illustrates a cross-sectional view of the LCD taken along a line FF' in FIG. 13.

According to the LCD of the third embodiment, as shown in FIGS. 14 and 15, two independent projections 6 and 19 are structured on the respective TFT glass substrate 10 and opposite facing glass substrate 11. The fabrication processes for the two projections 6 and 19 are identical to those in the first and second embodiment.

As shown in FIG. 14, the projection 6, which is made of metal pattern, is structured under part of the black matrix 9, and on the common electrode 4 on top of the TFT substrate 10. On the other hand, the projection 19 is structured to be part of the over-coating film 14 on the opposite facing substrate 11, under the same part of the black matrix 9. The projections 6 and 19 on the respective TFT substrate 10 and opposite facing substrate 11 face each other. The distance between the top surfaces of the alignment layers 15 and 16 on top of the respective projections 6 and 19 is shorter than the distance between the top surface of the alignment layer 15 on the data line 1 and the undersurface of the alignment layer 16 on the opposite facing substrate 11.

With this format, the heights of the respective projections 6 and 19 can be half of those of the respective first and second embodiments. The widths of the respective projections 6 and 19 are equal to or less than the diameter of the spacer 17 in the same format as the first and the second embodiment.

Incidentally, the present invention is not limited to the arrangement of the projections 6 and 19 facing each other and being positioned under a part of the black matrix 9. In other words, each of the projections 6 on the TFT glass substrate 10 can be positioned far from each of the projections 19 on the facing glass substrate 11 as long as they are positioned under part of the black matrix 9, so as to prevent each spacer 17 positioned under the black matrix 9 from climbing over and entering an optical transparent region. In this case, the distance between the top surface of the alignment layer 15 on top of each projection 6 and the undersurface of the alignment layer 16 on the facing glass substrate 11, and the distance between the undersurface of the alignment layer 16 on top of each projection 19 and the top surface of the alignment layer 15 on the TFT glass substrate 10 should both be shorter than the distance between the top surface of the alignment layer 15 on the data line 1 and the undersurface of the alignment layer 16 on the facing glass substrate 11.

Due to the aforementioned arrangement of the projections 6 and 19 facing each other, the number of the projections is doubled the number of those in each of the first and the second embodiments. This prevents each spacer positioned under the black matrix 9 from climbing over the projections and entering a transparent region.

Next, other projections 6 and 19 positioned near a TFT 3 will be described while referencing FIG. 15. As shown in FIG. 15, the projection 6, which is made of a metal pattern, is structured under part of the black matrix 9 and on the common electrode 4 formed near the scanning line 2 and TFT 3 on the TFT glass substrate 10. On the other hand, the projection 19, which is made of the same material as that of the over-coating film 14, is structured under part of the black matrix 9 on the undersurface of the opposite facing glass substrate 11, and is also positioned, in the horizontal direction, near the data line 1.

The projections 6 and 19 on the respective TFT glass substrate 10 and opposite facing substrate 11 face each other. The distance between the alignment layers 15 and 16 on the tops of the respective projections 6 and 19 is shorter than the distance between the top surface of the alignment layer 15 on both the scanning line 2 and the TFT 3, and the undersurface of the alignment layer 16 on the opposite facing glass substrate 11. This allows the heights of the respective projections 6 and 19 to be half the length of those of the first and the second embodiment. The widths of the respective projections 6 and 19 are equal to or less than the diameter of the spacer 17 in the same format as the first and the second embodiment.

Incidentally, up to this point, it has been explained that the projections 6 and 19 in FIG. 15 face each other. However, the present invention is not limited to this. Alternatively, each projection 6 can be positioned not facing each projection 19. In this case, the distance between the top surface of the alignment layer 15 on top of each projection 6 and the undersurface of the alignment layer 16 on the facing glass substrate 11 and the distance between the undersurface of the alignment layer 16 on top of each projection 19 and the top surface of the alignment layer 15 on the TFT glass substrate 10 should be both shorter than the distance between the top surface of the alignment layer 15 on both the scanning line 2 and TFT 3, and the undersurface of the alignment layer 16 on the facing glass substrate 1-1.

Due the structure of the projections 6 and 19 on the respective TFT glass substrate 10 and facing glass substrate 11, the total number of projections 6 and 19 is each double those of the first and the second embodiment. This allows a surer prevention of each spacer 17 under the black matrix 9 from entering an optical transparent region.

The difference between the distance from the top surface of the alignment layer 15 on the data line 1, the scanning line 2, and the TFT 3, to the undersurface of the alignment layer 16 on the opposite facing substrate 11, and the distance from the undersurface of the alignment layer 16 on the underside of the projection 19 to the top surface of the alignment layer 15 on the TFT substrate 10 is, as is in the same form as the first embodiment, equal to or longer than approximately 1% the length of the diameter of the spacer 17, and it is preferable that it be equal to or longer than approximately 2%. Also, the difference between the former distance and the distance between the top surface of the alignment layer 15 on top of the projection 6 and the undersurface of the alignment layer 16 at the opposite facing substrate 11 is equal to or longer than approximately 1% the length of the diameter of the spacer 17, and it is preferable that it be equal to or longer than approximately 2%.

Due to this format described above, even if a certain pressure or impulse happens to be applied onto the LCD panel of the third embodiment, each spacer 17 positioned under the black matrix and on either the data line 1, the scanning line 2, or the TFT 3, is prevented from moving, climbing over, and entering a transparent region. This prevents a possible increase in the total amount of leakage of light due to the entry of each spacer 17. As a result, the leakage of light decreases, and the contrast is improved. Also, the uneven display resulting from areas of the leakage of light being unevenly distributed is reduced. These advantages allow the provision of an active-matrix LCD with high reliability.

Incidentally, FIG. 13 illustrates continuously extending projections 6 and 19 positioned along the black matrix extensions. However, the present invention is not limited to this. Alternatively, the projections 6 and 19 can be made up of multiple, intermittent pieces positioned along the extensions of the black matrix 9.

(Fourth Embodiment)

Figure 16:
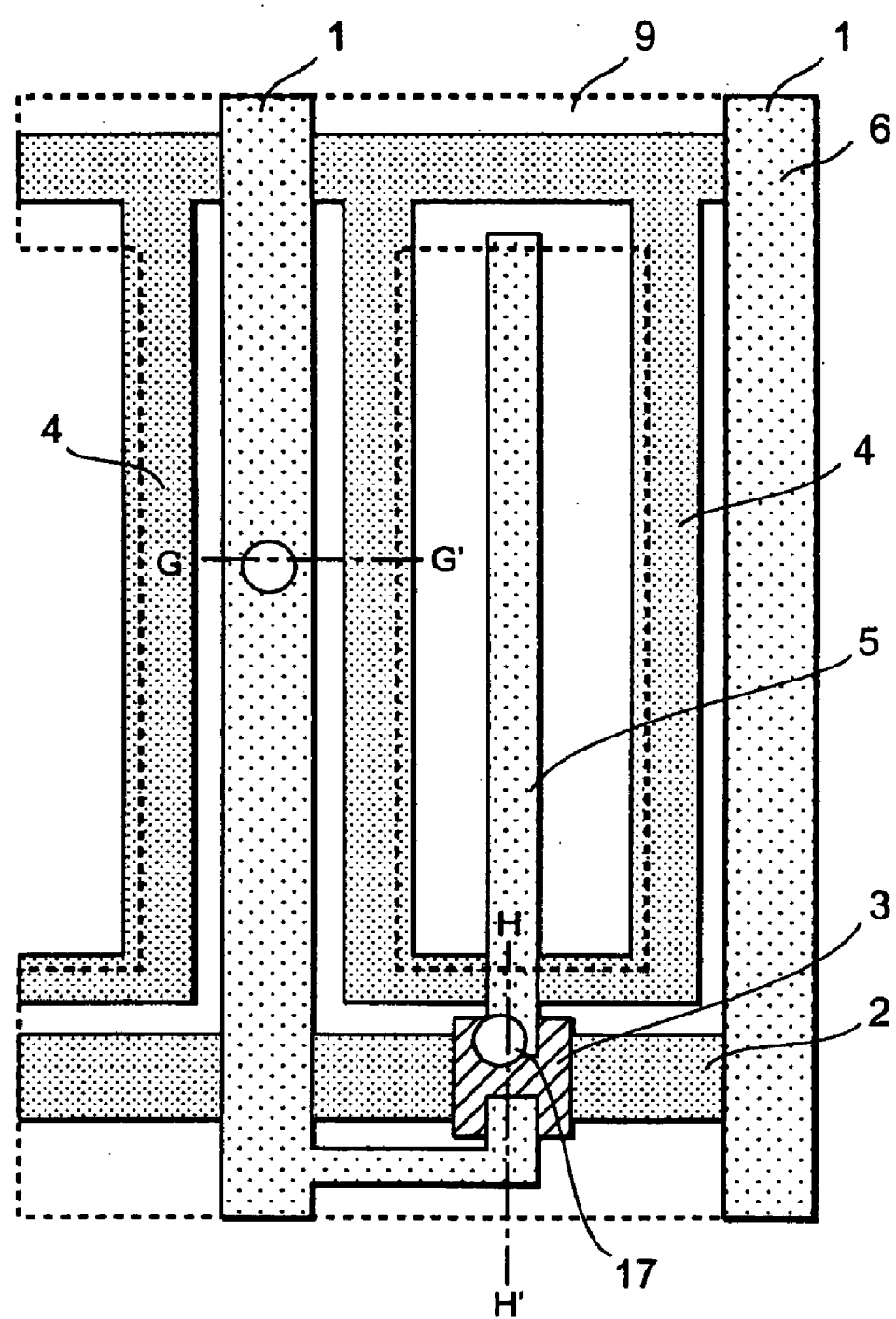
FIG. 16 illustrates a plan view of an LCD, according to the fourth embodiment of the present invention.
Figure 17:
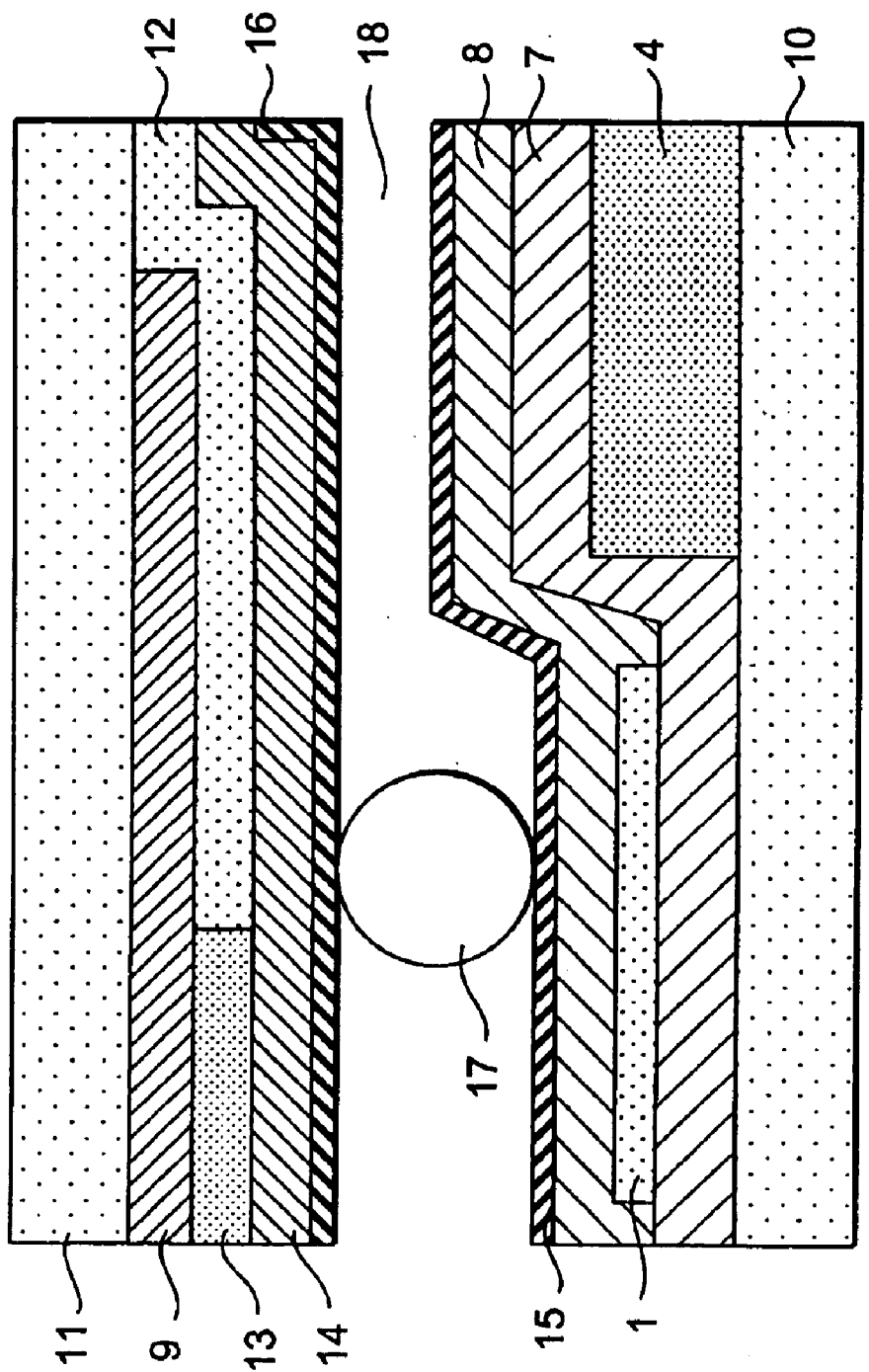
FIG. 17 illustrates a cross-sectional view of the LCD taken along a line GG' in FIG. 16.

Next, an LCD, according to the fourth embodiment of the present invention, will be described while referencing FIGS. 16 to 18. In brief, the LCD of the fourth embodiment is attained by structuring different types of projections on the TFT glass substrate 10 from the projections 6 and 19 in the first to the third embodiments. FIG. 16 illustrates a plan view of the LCD of the fourth embodiment. FIG. 17 illustrates a cross-sectional view of the LCD taken along a line GG' in FIG. 16; whereas FIG. 18 illustrates a cross-sectional view of the LCD taken along a line HH' in FIG. 16.

Figure 18:
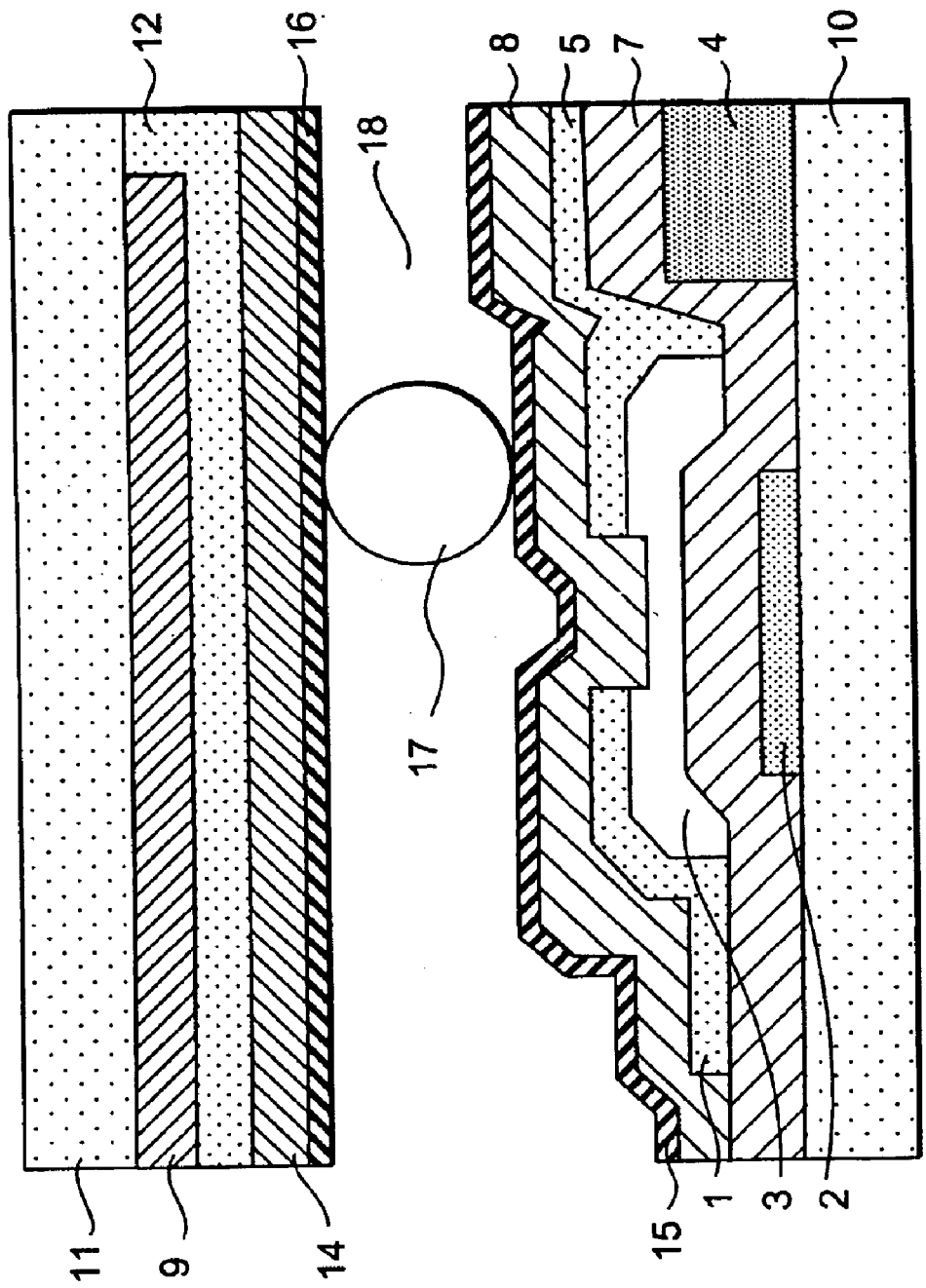
FIG. 18 illustrates a cross-sectional view of the LCD taken along a line HH' in FIG. 16.

As shown in FIGS. 17 and 18, each of the aforementioned projections or bumps are structured by positioning a common electrode 4 on top of the TFT glass substrate 10. This causes the distance between the top surface of each bump caused by the common electrode 4, and the underside of the opposite facing glass substrate 11 to be shorter than the distance between the top surface of the alignment layer 15 on the data line 1, the scanning line 2, and the TFT 3, and the undersurface of the alignment layer 16 of the opposite facing glass substrate 11.

The difference between the distance from the top surface of the alignment layer 15 on the data line 1, the scanning line 2 and the TFT 3, to the undersurface of the alignment layer 16 of the facing glass substrate 11, and the distance from the top surface of the bump on the common electrode 4 to the undersurface of the alignment layer 16 of the opposite facing glass substrate 11 is equal to or longer than approximately 1% the length of the diameter of the spacer 17, and it is preferable that it be equal to or longer than approximately 2%. In other words, the height of each bump is equal to or longer than approximately 1% the length of the diameter of the spacer 17, and it is preferable that it be equal to or longer than approximately 2%. This allows the prevention of the spacer 17 from moving and entering an optical transparent region. In addition, each bump can be formed more easily by structuring the common electrode 4 on the TFT substrate 10 than structuring the projections 6 and 19 according to the first through third embodiments. Accordingly, each bump can be fabricated by shortened process steps.

Due to the form of the LCD of the fourth embodiment, even if a certain pressure or impulse happens to be applied onto the LCD panel, each spacer 17 under the black matrix 9 and on either the data line 1, the scanning line 2, or the TFT 3, is prevented from moving and entering a transparent region. This prevents a possible increase in a total leakage of light due to each spacer 17. As a result, the displaying contrast is improved. Also, the uneven display resulting from areas of leakage of light being unevenly distributed is reduced. These advantages allow the provision of an active-matrix LCD with high reliability.

(Fifth Embodiment)

Figure 19:
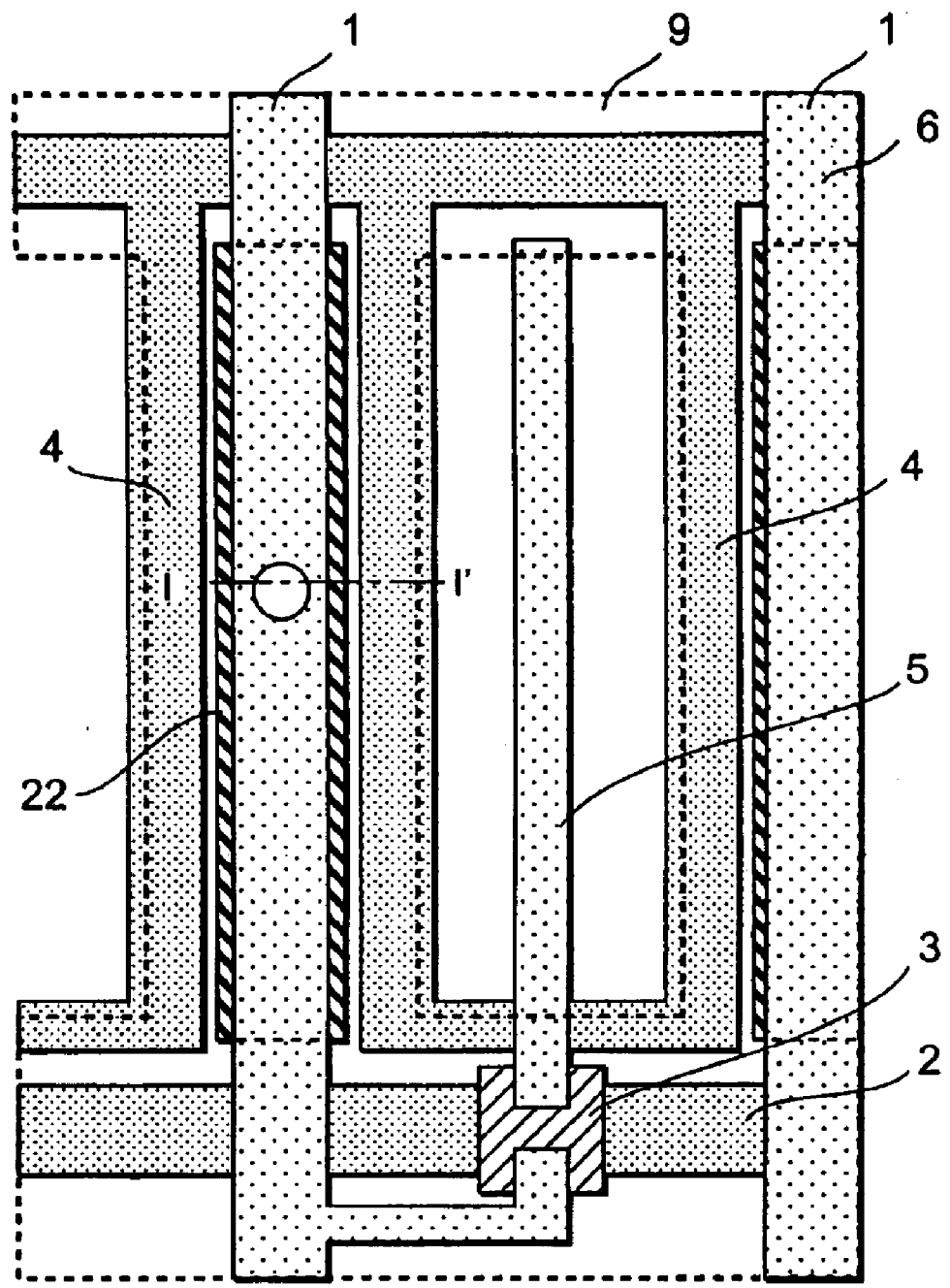
FIG. 19 illustrates a plan view of an LCD, according to the fifth embodiment of the present invention.
Figure 20:
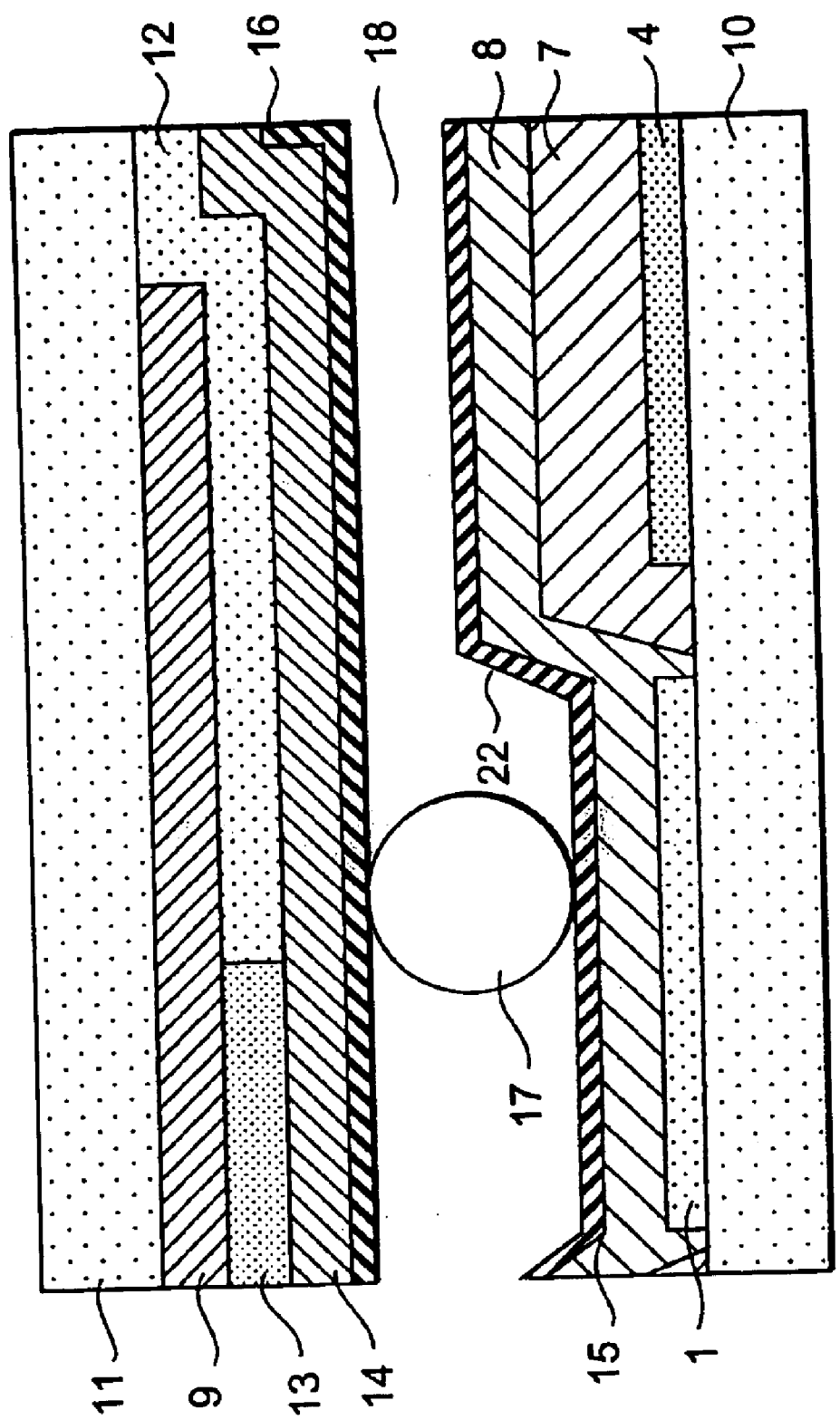
FIG. 20 illustrates a cross-sectional view of the LCD taken along a line II' in FIG. 19.

Next, an LCD, according to the fifth embodiment of the present invention, will be described while referencing FIGS. 19 to 20. In this embodiment, in place of forming each projection or bump, which prevents each spacer 17 within opaque regions (i.e., under the black matrix 9) from entering an optical transparent region, a ditch is formed on the inner surface of either the TFT glass substrate 10 or the facing glass substrate 11, so as to confine each spacer 17 within it, as shown in FIG. 20. FIG. 19 illustrates a plan view of the LCD of the fifth embodiment; whereas FIG. 20 illustrates a cross-sectional view of the LCD taken along a line II' in FIG. 19.

Figure 21:
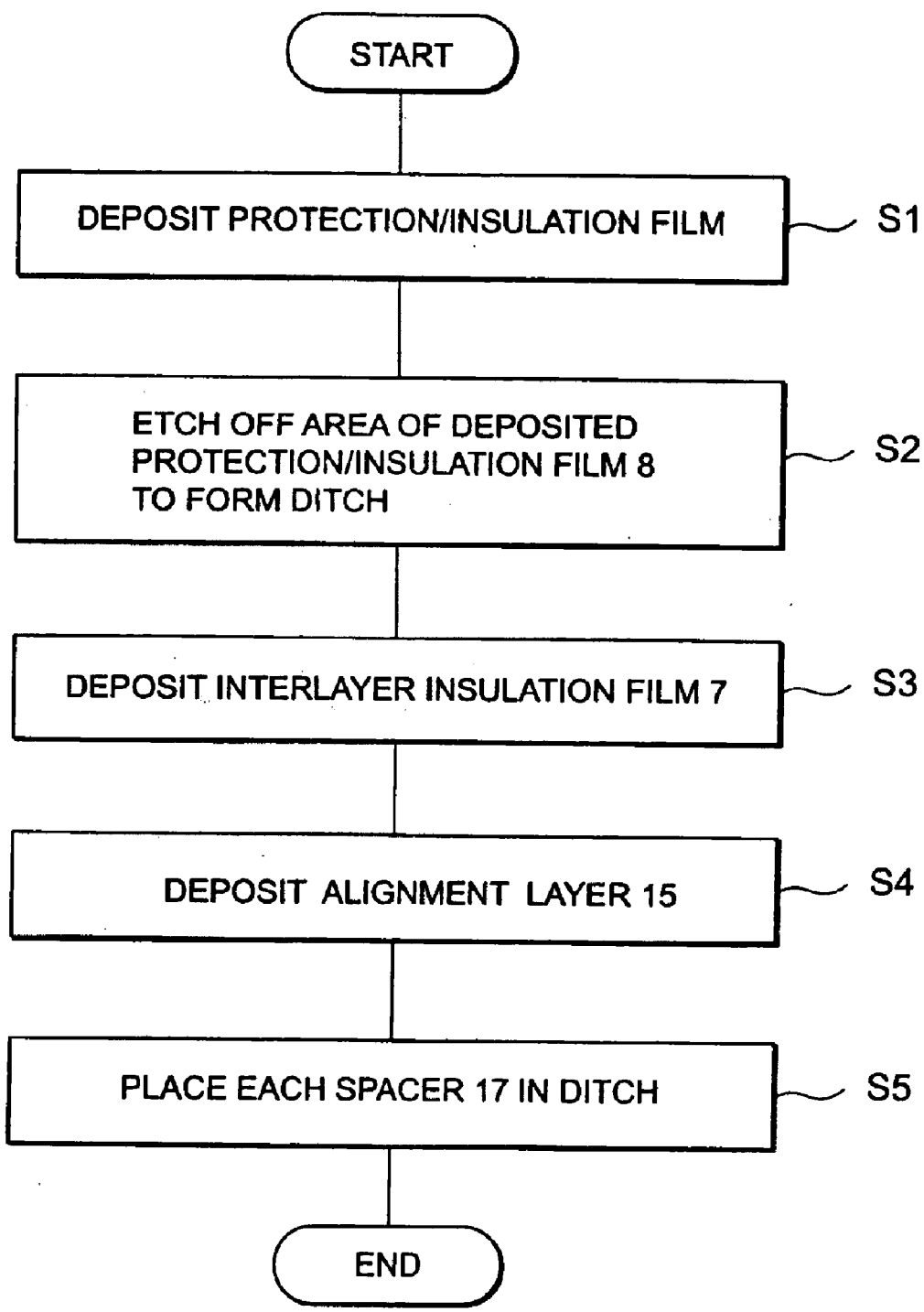
FIG. 21 is a flowchart showing process steps for structuring a ditch that prevents each spacer from entering a transparent region.

In FIG. 20, the ditch where each spacer 17 is confined is formed on the inner surface of the TFT substrate 10 under the black matrix 9. As shown in the flowchart in FIG. 21, the ditch is formed by the following process steps: First, a protection/insulation film 8 is deposited over the surface of both the data line 1 and common electrode 4, which have been formed on top of the TFT glass substrate 10 (step S1); Secondly, an area of the deposited protection/insulation film 8 under the black matrix 9, where at least one spacer 17 is later positioned, is etched off so as to form a ditch (step S2); Thirdly, interlayer insulation film 7 is deposited onto the resultant surface (step S3); Fourthly, an alignment layer 15 is deposited onto the resultant surface (step S4); Fifthly, a spacer 17 is placed within the resultant ditch (step S5); Lastly, the opposite facing substrate 11 with the black matrix 9, colored layers 12 and 13, over-coating film 14, and alignment layer 16, which have been arranged in the format as shown in FIG. 20, is fixed onto the spacers 17 so as to face the TFT glass substrate 10. With this structure, each spacer 17 in the ditch cannot go over the wall 22 of the ditch, thus being confined within it.

The distance between the top surface of the alignment layer 15 on the common electrode 4 and the inner surface of the alignment layer 16 on the opposite facing glass substrate 11 is shorter than the distance between the top surface of the alignment layer 15 on the signal 1 and the inner surface of the alignment layer 16 on the facing glass substrate 11, as shown in FIG. 20. The difference between the former distance and the latter distance is equal to or longer than approximately 1% the length of the diameter of the spacer 17, and it is preferable that it be equal to or longer than approximately 2%. This allows the prevention of the spacer 17 from moving and entering an optical transparent region. As a result, even if a certain pressure or impulse happens to be applied onto the LCD, each spacer 17 within the on ditch is prevented from moving and entering a transparent region. This prevents an increase in total leakage of light around each spacer 17. As a result, the uneven display resulting from areas of the leakage of light being unevenly distributed is reduced. These advantages allow the provision of an active-matrix LCD with high reliability and high displaying quality.

In the above description, the case where the ditch is formed at the TFT glass substrate 10 is explained. However, the present invention is not limited to this. A ditch that confines each spacer 17 within it can be naturally formed on the opposite facing glass substrate 11.

Furthermore, in the above description, the case where the present invention is used for a lateral electric field-type/TFT active matrix LCD is explained. However, the present invention is not limited to this. The structure with the projections, the bumps, and the ditches as described above, according to the present invention, can also be naturally used for the simple matrix TN(twisted nematic)- and STN(super twisted nematic)-type LCD, the ferroelectric LCD, the polymer disbursed LCD, etc. The lateral electric field-type active matrix LCD, in particular, often uses the normally black system (i.e., black is displayed while no voltage is applied), and may easily develop leakage of light due to the disarray in liquid crystal molecule orientation around each spacer. This problem of leakage of light can be prevented by utilizing the aforementioned structures according to the present invention.

LCDs, and their manufacturing methods, according to the present invention, have been described in connection with several preferred embodiments. It is to be understood that the subject matter encompassed by the present invention is not limited to that specified embodiment. On the contrary, it is intended to include all alternatives, modifications, and equivalents as can be included within the spirit and scope of the following claims.

What is claimed is:

1. A liquid crystal display (LCD), comprising at least one spacer which is positioned under an opaque region, and at least one projection which is formed under said opaque region, and on at least one of the inner-most surfaces of a first and a second substrate.

* * * * *